US012674946B2

(12) United States Patent
Ito

(10) Patent No.: US 12,674,946 B2
(45) Date of Patent: Jul. 7, 2026

(54) CAGE AND CAGE ASSEMBLY

(71) Applicant: Yamaichi Electronics Co., Ltd., Tokyo (JP)

(72) Inventor: Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 296 days.

(21) Appl. No.: 18/522,823

(22) Filed: Nov. 29, 2023

(65) Prior Publication Data

US 2025/0172775 A1 May 29, 2025

(51) Int. Cl.
G02B 6/42 (2006.01)

(52) U.S. Cl.
CPC ........... G02B 6/426 (2013.01); G02B 6/4277 (2013.01); G02B 6/4278 (2013.01); G02B 6/428 (2013.01)

(58) Field of Classification Search
CPC . G02B 6/4277; G02B 6/44524; H05K 9/0058
See application file for complete search history.

(56) References Cited

U.S. PATENT DOCUMENTS

| | | | |
|---|---|---|---|
| 7,037,136 B1 * | 5/2006 | Korsunsky | ......... H01R 13/6594 361/728 |
| 8,426,751 B2 | 4/2013 | Lee et al. | |
| 9,407,046 B1 | 8/2016 | Bucher | |
| 10,114,182 B2 | 10/2018 | Zbinden et al. | |
| 11,650,385 B2 * | 5/2023 | Goergen | .............. G02B 6/4277 385/92 |
| 2006/0003632 A1 | 1/2006 | Long | |
| 2007/0128936 A1 * | 6/2007 | Long | ................. H01R 13/6584 439/607.28 |

(Continued)

FOREIGN PATENT DOCUMENTS

| | | |
|---|---|---|
| CN | 113747734 A | 12/2021 |
| CN | 113885138 A | 1/2022 |

(Continued)

OTHER PUBLICATIONS

Extended European Search Report issued May 2, 2025 in EP Application No. 24209478.7.

(Continued)

*Primary Examiner* — Charlie Y Peng
(74) *Attorney, Agent, or Firm* — Panitch Schwarze Belisario & Nadel LLP

(57) ABSTRACT

A cage configured to be attached to a face of a circuit board and accommodate external devices inserted into the cage along a depth direction substantially orthogonal to the face includes at least one vertical unit. The vertical unit defines a port set where ports as spaces to accommodate the external devices are aligned in the vertical direction, has two vertical plates extending in the vertical direction, spanning over the entire height in the vertical direction of the port set, and arranged to face each other in the horizontal direction spaced from each other by a distance corresponding to a width in the horizontal direction of the ports, and has horizontal plates extending in the horizontal direction, arranged between the vertical plates, and arranged to face each other in the vertical direction. In the vertical unit, the ports are defined by the two vertical plates and the horizontal plates.

16 Claims, 22 Drawing Sheets

(56)          References Cited

U.S. PATENT DOCUMENTS

| | | | |
|---|---|---|---|
| 2009/0257202 A1 | 10/2009 | Lee et al. | |
| 2010/0254112 A1* | 10/2010 | Brown ................. | G02B 6/4201 |
| | | | 361/818 |
| 2015/0087164 A1 | 3/2015 | Kachlic et al. | |
| 2016/0359278 A1 | 12/2016 | Kachlic | |
| 2019/0199468 A1* | 6/2019 | Zhao ..................... | H04L 1/0025 |
| 2019/0261534 A1 | 8/2019 | Jochim et al. | |
| 2022/0039556 A1 | 2/2022 | Fulbright et al. | |
| 2022/0087070 A1 | 3/2022 | Wang et al. | |
| 2022/0416371 A1* | 12/2022 | Heinle ................ | H01M 10/486 |
| 2023/0305247 A1 | 9/2023 | Hemp et al. | |
| 2024/0055809 A1* | 2/2024 | Phillips ................ | G02B 6/4277 |

FOREIGN PATENT DOCUMENTS

| | | | |
|---|---|---|---|
| JP | 6374011 B2 | 8/2018 | |
| TW | M354926 U | 4/2009 | |
| TW | I353209 B | 11/2011 | |

OTHER PUBLICATIONS

Office Action and Search Report issued Aug. 5, 2025 in TW Application No. 113145640.

* cited by examiner

CAGE AND CAGE ASSEMBLY

BACKGROUND

1. Technical Field

The present disclosure relates to a cage and a cage assembly.

2. Description of Related Art

Optical modules that convert electrical signals into optical signals and vice versa (also referred to as optical transceivers) may be accommodated in a cage and, in this state, the optical modules may be mounted on a printed wiring board and electrically connected to application specific integrated circuits (ASIC), for example.

One example of a cage accommodating a plurality of optical modules is disclosed in U.S. Patent Publication No. 2022/0087070.

Further, heat sinks for cooling these optical modules may be accommodated in the cage.

The plurality of optical modules (and the plurality of heat sinks) are accommodated in a plurality of ports of the cage in the actual implementation.

In this state, the plurality of ports may be formed of multiple types of plates. For example, a plurality of vertical plates extending in a vertical direction D2 and a plurality of horizontal plates extending in a horizontal direction D3 may be combined to form the plurality of ports.

However, if the multiple types of plates are inappropriately combined, these plates may bend.

Accordingly, the present disclosure intends to provide a cage and a cage assembly having a structure in which plates are less likely to bend.

BRIEF SUMMARY

To achieve the above object, the cage and the cage assembly of the present disclosure employ the following solutions.

A cage according to the first aspect of the present disclosure is a cage configured to be attached to a first face of an external board and accommodate a plurality of external devices inserted into the cage along a depth direction substantially orthogonal to the first face. When a direction orthogonal to the depth direction is defined as a vertical direction, and a direction orthogonal to the depth direction and the vertical direction is defined as a horizontal direction, the cage includes at least one vertical unit, the vertical unit defines a port set in which a plurality of ports as spaces accommodating the external devices are aligned in a line in the vertical direction, has two vertical plates extending in the vertical direction, spanning over the entire height in the vertical direction of the port set, and arranged so as to face each other in the horizontal direction and be spaced from each other by a distance corresponding to a width in the horizontal direction of the ports, and has a plurality of horizontal plates extending in the horizontal direction, arranged between the vertical plates, and arranged so as to face each other in the vertical direction. In the vertical unit, the plurality of ports included in the port set are defined by the two vertical plates and the plurality of horizontal plates.

According to the cage of the present aspect, the cage includes at least one vertical unit, the vertical unit defines a port set in which a plurality of ports as spaces accommodating the external devices are aligned in a line in the vertical direction, has two vertical plates extending in the vertical direction, spanning over the entire height in the vertical direction of the port set, and arranged so as to face each other in the horizontal direction and be spaced from each other by a distance corresponding to a width in the horizontal direction of the ports, and has a plurality of horizontal plates extending in the horizontal direction, arranged between the vertical plates, and arranged so as to face each other in the vertical direction, and in the vertical unit, the plurality of ports included in the port set are defined by two vertical plates and the plurality of horizontal plates. Thus, the vertical plate functions as a wall in the vertical direction of the port set (that is, a wall in the vertical direction shared by all the ports aligned in a line in the vertical direction) and the horizontal plate functions as a wall in the horizontal direction of each port included in the port set, and therefore the dimension along the horizontal direction of the horizontal plate can be substantially the same as the horizontal dimension of a single port. Thus, the width dimension of the horizontal plate can be minimized. This makes the horizontal plate less likely to bend in the vertical direction.

Further, the port set consisting of a plurality of ports aligned in a line in the vertical direction can be unitized as the vertical unit. Accordingly, only by changing the number of vertical units aligned in the horizontal direction, it is possible to increase or reduce the number of ports/port sets in a simple manner.

Further, in the cage according to the second aspect of the present disclosure, in the first aspect, the number of vertical units is plural, and the plurality of vertical units are aligned in a line in the horizontal direction. A clearance as a space accommodating none of the external devices is defined between a first vertical unit and a second vertical unit adjacent to the first vertical unit in the horizontal direction in the plurality of vertical units aligned in a line in the horizontal direction, and the clearance has a rear opening facing the external board and a front opening located opposite to the rear opening.

According to the cage of the present aspect, the plurality of vertical units are aligned in a line in the horizontal direction, a clearance as a space accommodating none of the external devices is defined between a first vertical unit and a second vertical unit in the plurality of vertical units aligned in a line in the horizontal direction, and the clearance has a rear opening facing the external board and a front opening located opposite to the rear opening. Thus, for example, it is possible to cause cooling air to flow from the front opening to the rear opening through the clearance as a flow path. Thus, the external device accommodated in the port can be cooled by the air flowing through the clearance adjacent to the port. Further, since the external devices can be forcibly spaced from each other in the horizontal direction, this can realize a structure in which heat is less likely to be retained.

Further, the cage according to the third aspect of the present disclosure, in the second aspect, includes at least one front plate, and the front plate covers the front opening of the clearance and is fixed to a front edge of one vertical plate of the first vertical unit and a front edge of one vertical plate of the second vertical unit facing each other interposing the clearance.

According to the cage of the present aspect, the front plate covers the front opening of the clearance and is fixed to a front edge of one vertical plate of the first vertical unit and a front edge of one vertical plate of the second vertical unit facing each other interposing the clearance, and thus the first vertical unit and the second vertical unit can be coupled by the front plate.

Further, two vertical plates facing each other interposing the clearance (two vertical plates belonging to different vertical units) are fixed by the front plate, and thus each vertical plate is less likely to bend in the horizontal direction.

Further, in the cage according to the fourth aspect of the present disclosure, in the third aspect, the front plate has a plurality of connecting holes, and the connecting holes connect the clearance to outside.

According to the cage of the present aspect, the front plate has a plurality of connecting holes, and the connecting holes connect the clearance to outside. This allows cooling air to easily flow into the clearance, and the cooling of the external device is facilitated even after the front plate is provided.

Further, the cage according to the fifth aspect of the present disclosure, in the third aspect or the fourth aspect, includes a plurality of EMI fingers, the EMI fingers are attached to the front edge while interposing and pinching both faces of the vertical plates, and the front plate is made of metal and is in contact with the EMI fingers.

According to the cage of the present aspect, the EMI fingers are attached to the front edge while interposing and pinching both faces of the vertical plates, and the front plate is made of metal and is in contact with the EMI fingers. Thus, when a clearance is provided between the vertical units, it is possible to improve the shield property against noise leaking from the clearance.

Further, in the cage according to the sixth aspect of the present disclosure, in any one of the first aspect to the fifth aspect, the plurality of vertical plates each have a fixing part, and the fixing part protrudes in the depth direction from a rear edge of the vertical plate facing the external board and is configured to be fixed to the external board.

According to the cage of the present aspect, the fixing part protrudes in the depth direction from a rear edge of the vertical plate facing the external board and is configured to be fixed to the external board, and thus each vertical unit and the external board can be firmly fixed to each other. This makes the external board less likely to bend during insertion/extraction of the external device, for example.

Further, two vertical plates facing each other interposing the clearance (two vertical plates belonging to different vertical units) are fixed by the external board, and thus each vertical plate is less likely to bend in the horizontal direction.

Further, since each vertical unit can be positioned to the external board, ease of assembly of the cage can be improved.

Further, in the cage according to the seventh aspect of the present disclosure, in the sixth aspect, the fixing part is a press-fit pin to be press-fitted to the external board.

According to the cage of the present aspect, since the fixing part is a press-fit pin to be press-fitted to the external board, the vertical plate can be fixed to the external board in a simple manner.

Further, in the cage according to the eighth aspect of the present disclosure, in any one of the first aspect to the seventh aspect, the plurality of horizontal plates have a plurality of connecting holes, and the connecting holes connect a top face and a bottom face of each of the horizontal plates.

According to the cage of the present aspect, the horizontal plates have a plurality of connecting holes, and the connecting holes connect the top face and the bottom face of each horizontal plate. This allows cooling air to easily flow between the ports adjacent to each other in the vertical direction, and the cooling of the external device is facilitated.

Further, in the cage according to the ninth aspect of the present disclosure, in any one of the first aspect to the eighth aspect, each of the external devices is an optical module, or an optical module and a heat sink for cooling the optical module.

According to the cage of the present aspect, the external device is an optical module, or an optical module and a heat sink for cooling the optical module.

Further, in the cage according to the tenth aspect of the present disclosure, in the ninth aspect, in the plurality of ports aligned in a line in the vertical direction, a first port is the port in which the optical module is accommodated, and a second port located adjacent to the first port in the vertical direction and located above the first port is the port in which the heat sink is accommodated. The horizontal plate separating the first port and the second port from each other has a through-opening, and the through-opening connects the first port and the second port.

A first port is the port in which the optical module is accommodated, a second port located adjacent to the first port in the vertical direction and located above the first port is the port in which the heat sink is accommodated, the horizontal plate separating the first port and the second port from each other has a through-opening, and the through-opening connects the first port and the second port. Thus, a part of the heat sink accommodated in the second port can be in contact with the optical module accommodated in the first port via the through-opening. Accordingly, the optical module can be cooled by the heat sink.

Further, the cage according to the eleventh aspect of the present disclosure, in any one of the first aspect to the tenth aspect, includes: a top plate; and a bottom plate. When a set of the plurality of vertical units aligned in a line in the horizontal direction is defined as a unit set, the top plate spans over the entire width in the horizontal direction of the unit set and is fixed to an upper edge of each of the vertical plates of the vertical units included in the unit set, and the bottom plate spans over the entire width in the horizontal direction of the unit set and is fixed to a lower edge of each of the plurality of vertical plates of the plurality of vertical units included in the unit set.

According to the cage of the present aspect, the cage includes: a top plate; and a bottom plate. When a set of the plurality of vertical units aligned in a line in the horizontal direction is defined as the unit set, the top plate spans over the entire width in the horizontal direction of a unit set and is fixed to an upper edge of each of the vertical plates of the plurality of vertical units included in the unit set, and the bottom plate spans over the entire width in the horizontal direction of the unit set and is fixed to a lower edge of each of the vertical plates of the plurality of vertical units included in the unit set. Thus, only by preparing the top plates and the bottom plates having different sizes (specifically, different dimensions in the horizontal direction) without changing the configuration of the vertical units, it is possible to configure the cage in which any number of vertical units are aligned in the horizontal direction. Accordingly, it is possible to easily expand variations of the cage with different number of ports.

Further, in the cage according to the twelfth aspect of the present disclosure, in the eleventh aspect, the top plate and/or the bottom plate has a fixing part, and the fixing part protrudes along the depth direction from a rear edge of the top plate and/or the bottom plate facing the external board and is configured to be fixed to the external board.

According to the cage of the present aspect, the fixing part protrudes along the depth direction from a rear edge of the top plate and/or the bottom plate facing the external board and is configured to be fixed to the external board, and thus each vertical unit and the external board can be firmly fixed to each other. This makes the external board less likely to bend during insertion/extraction of the external device, for example.

Further, in the cage according to the thirteenth aspect of the present disclosure, in the twelfth aspect, the fixing part is a press-fit pin to be press-fitted to the external board.

According to the cage of the present aspect, since the fixing part is a press-fit pin to be press-fitted to the external board, the top plate and/or the bottom plate can be fixed to the external board in a simple manner.

Further, in the cage according to the fourteenth aspect of the present disclosure, in any one of the eleventh aspect to the thirteenth aspect, the bottom plate has a plurality of connecting holes, and the connecting holes connect a top face and a bottom face of the bottom plate.

According to the cage of the present aspect, the bottom plate has a plurality of connecting holes, and the connecting holes connect the top face and the bottom face of the bottom plate. This allows air to easily flow out of the port on the lowermost level, and cooling of the external device is facilitated.

Further, a cage assembly according to the fifteenth aspect of the present disclosure includes: the cage according to any one of the first aspect to the fourteenth aspect; and a circuit board as the external board.

Further, a cage assembly according to the sixteenth aspect of the present disclosure includes: the cage according to the seventh aspect; and a circuit board as the external board. The circuit board has a plurality of ventilation openings, and a plurality of through-holes, the plurality of ventilation openings are openings penetrating through between the first face of the circuit board and a second face corresponding to a back face of the first face, are arranged so as to each correspond to a position of each of the ports, and are aligned in a line with a spacing from each other in the horizontal direction, and the plurality of through-holes each are a hole into which the press-fit pin of each of the vertical plates is press-fitted and are arranged between the ventilation openings in the horizontal direction.

According to the cage assembly of the present aspect, the cage assembly includes: the cage; and a circuit board as the external board. The circuit board has a plurality of ventilation openings, and a plurality of through-holes, the plurality of ventilation openings are openings penetrating through between the first face of the circuit board and a second face corresponding to a back face of the first face, are arranged so as to each correspond to a position of each of the ports, and are aligned in a line with a spacing from each other in the horizontal direction, and the plurality of through-holes each are a hole into which the press-fit pin of each of the vertical plates is press-fitted and are arranged between the ventilation openings in the horizontal direction. Accordingly, a region used for routing of internal layer wirings can be ensured between the ventilation openings aligned in the vertical direction when the ventilation openings for discharging cooling air out of the port is formed in the circuit board.

DETAILED DESCRIPTION

A cage and a cage assembly according to one embodiment of the present disclosure will be described below with reference to the drawings.

Note that "depth direction D1", "vertical direction D2", and "horizontal direction D3" used in the following description are for assisting in understanding of the description and not intended to limit the actual position or attitude.

Further, when a direction in which an optical module is inserted/extracted is defined as a "depth direction D1 (front-rear direction)", "vertical direction D2 (height direction)" is orthogonal to the depth direction D1, and "horizontal direction D3 (width direction)" is orthogonal to the depth direction D1 and the vertical direction D2.

Further, "depth direction D1" means both directions, that is, a direction from the near (front) to the far (rear) and a direction from the far to the near, "vertical direction D2" means both directions, that is, a direction from the above to the below and a direction from the below to the above, and "horizontal direction D3" means both directions, that is, a direction from the right to the left and a direction from the left to the right.

Further, "height" or "height dimension" means a distance or a dimension along the vertical direction D2, and "width" or "width dimension" means a distance or a dimension along the horizontal direction D3.

Further, in a circuit board having a first face and a second face, when a face facing a cage is defined as a "front face (first face)" and a face opposite to the front face is defined as a back face (second face)", the position of the front face with respect to the back face is "front" or "forward", and the position of the back face with respect to the front face is "rear" or "rearward".

Overview of Cage Assembly

Figure 1:
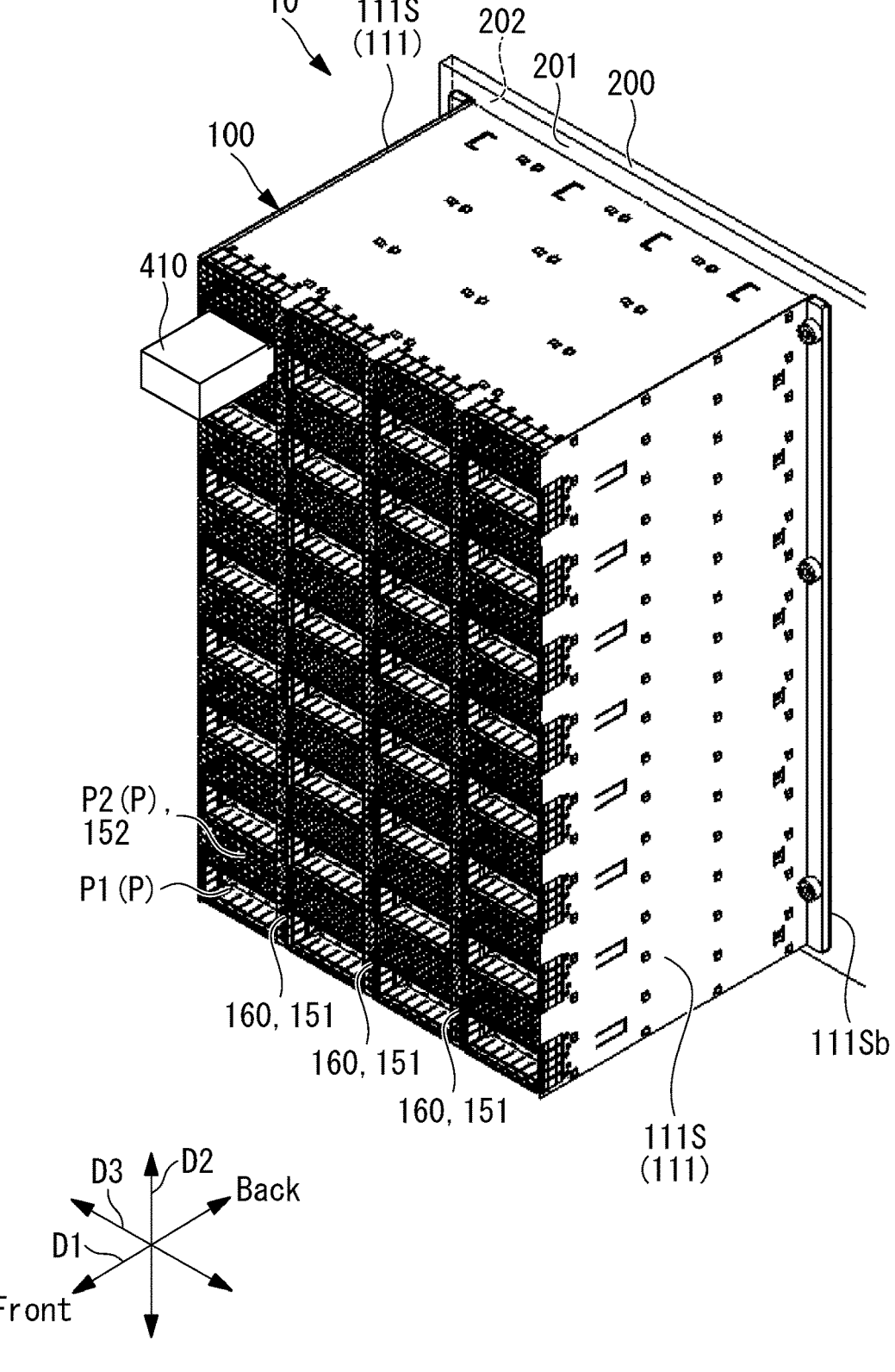
FIG. 1 is a perspective view of a cage assembly according to one embodiment of the present disclosure.
Figure 2:
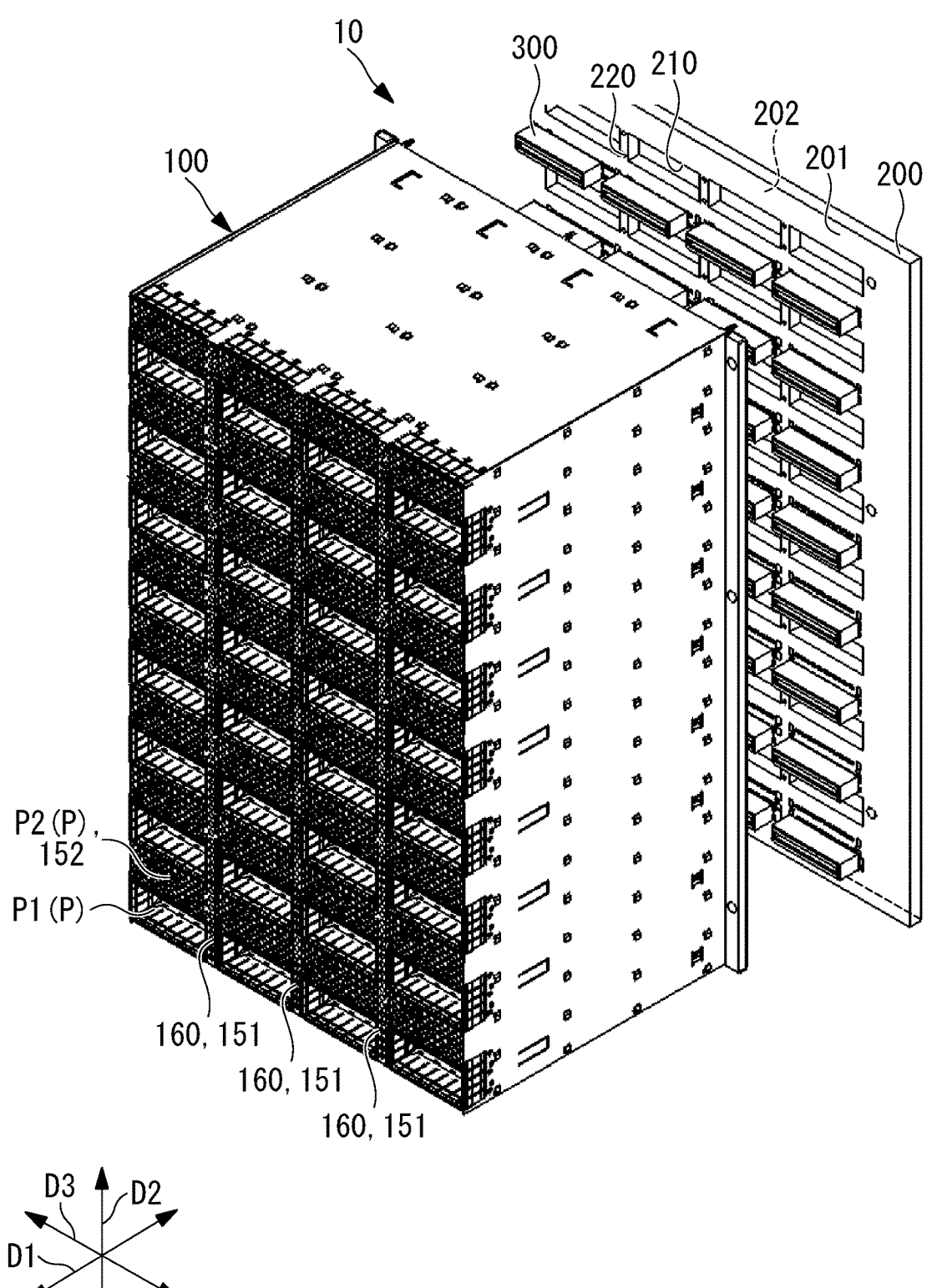
FIG. 2 is an exploded perspective view of the cage assembly according to one embodiment of the present disclosure.
Figure 3:
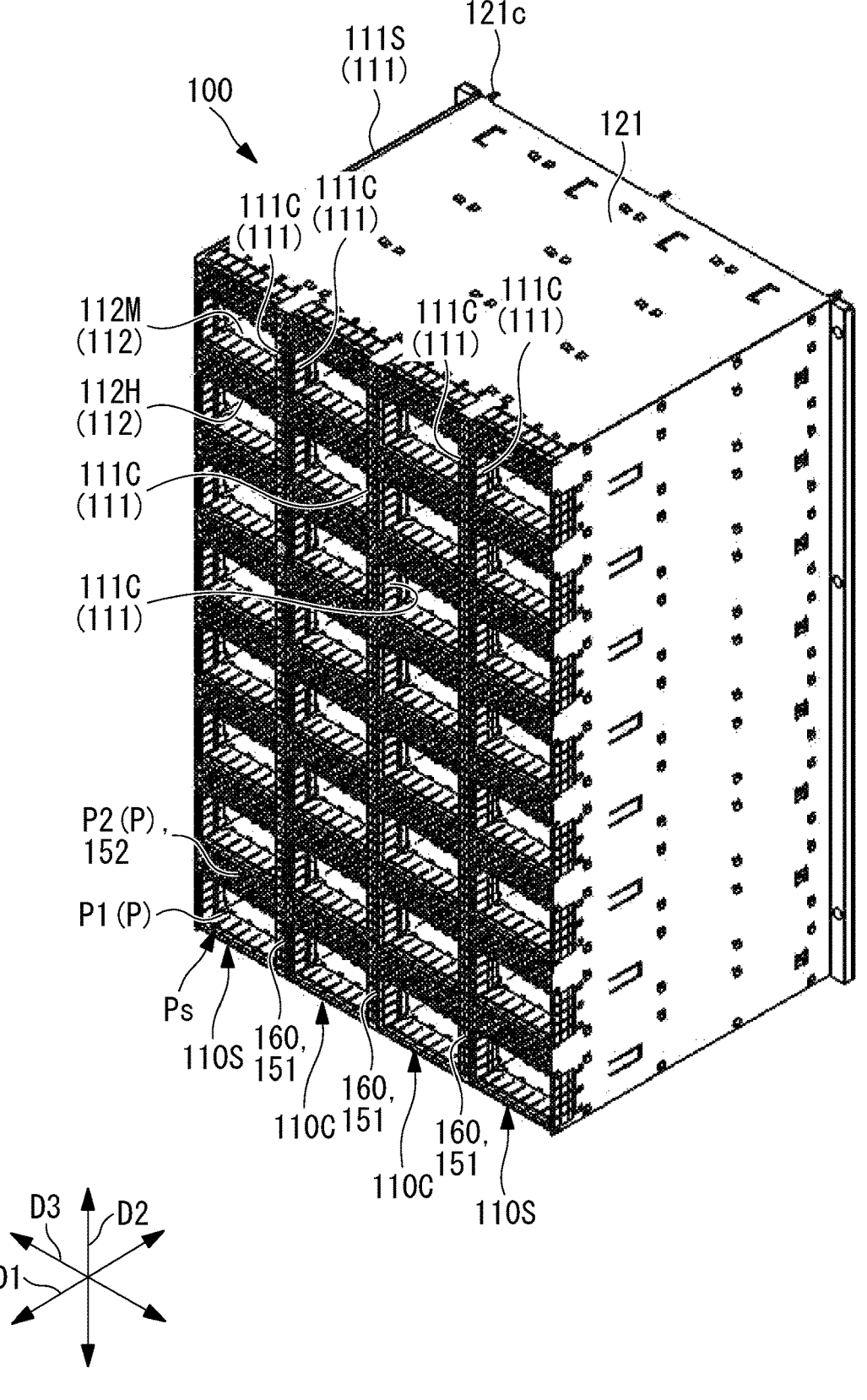
FIG. 3 is a front perspective view of a cage according to one embodiment of the present disclosure.
Figure 4:
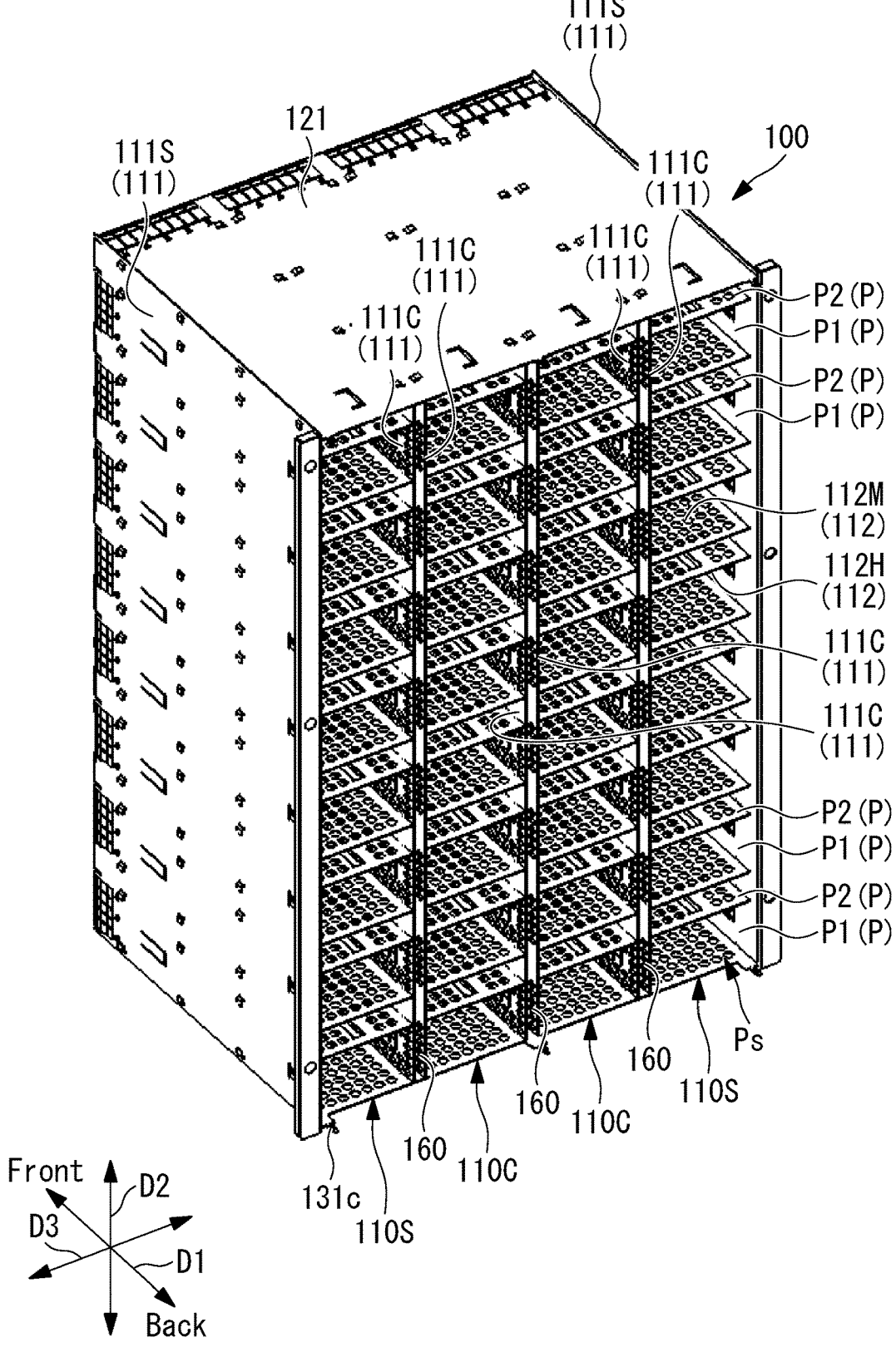
FIG. 4 is a back perspective view of the cage according to one embodiment of the present disclosure.

As illustrated in FIG. 1 and FIG. 2, a cage assembly 10 includes a cage 100 and a circuit board 200 (external board) to which a plurality of connectors 300 are attached.

The circuit board 200 has a front face 201 (first face) and a back face 202 (second face) corresponding to the opposite side to the front face 201, and the cage 100 and the plurality of connectors 300 are attached to the front face 201.

ASICs (not illustrated) are mounted on the back face 202 of the circuit board 200.

An optical module 410 is electrically connected to each connector 300. Specifically, a module-adapting board included in the optical module 410 is inserted into a slot of the connector 300 along the depth direction D1 and comes into contact with a plurality of terminals (contact pins) of the connector 300. Accordingly, the optical module 410 is electrically connected to the ASIC via the connector 300 and the circuit board 200.

The cage assembly 10 is supplied with cooling air.

The cooling air is blown toward the front face of the cage 100 by, for example, a fan device (not illustrated).

Such cooling air flows into a plurality of ports P and a plurality of clearances 160 described later.

Basic Configuration of Cage

As illustrated in FIG. 3 to FIG. 6, the cage 100 is a structure that accommodates a plurality of optical modules 410 and a plurality of heat sinks 420 or accommodates a plurality of optical modules 410.

The cage 100 has a plurality of ports P.

Some ports P of the plurality of ports P are aligned in a line in the vertical direction D2 to form a port set Ps. Further, the plurality of port sets Ps are aligned with spacings (clearances 160) therebetween in the horizontal direction D3. In the case of the present embodiment, 16 ports P are aligned in a line in the vertical direction D2 to form a single port set Ps. Further, four port sets Ps are aligned with spacings (clearances 160) therebetween in the horizontal direction D3.

The plurality of ports P include a plurality of first ports P1 and a plurality of second ports P2.

First ports P1 are spaces in which the optical modules 410 are accommodated, and second ports P2 are spaces in which heat sinks are accommodated. Therefore, each first port P1 is adapted to the shape and size of the optical module 410, and each second port P2 is adapted to the shape and size of the heat sink 420.

The optical module 410 may be of a Riding Heat Sink (RHS) type or may be of an Integrated Heat Sink (IHS) type.

Figure 6:
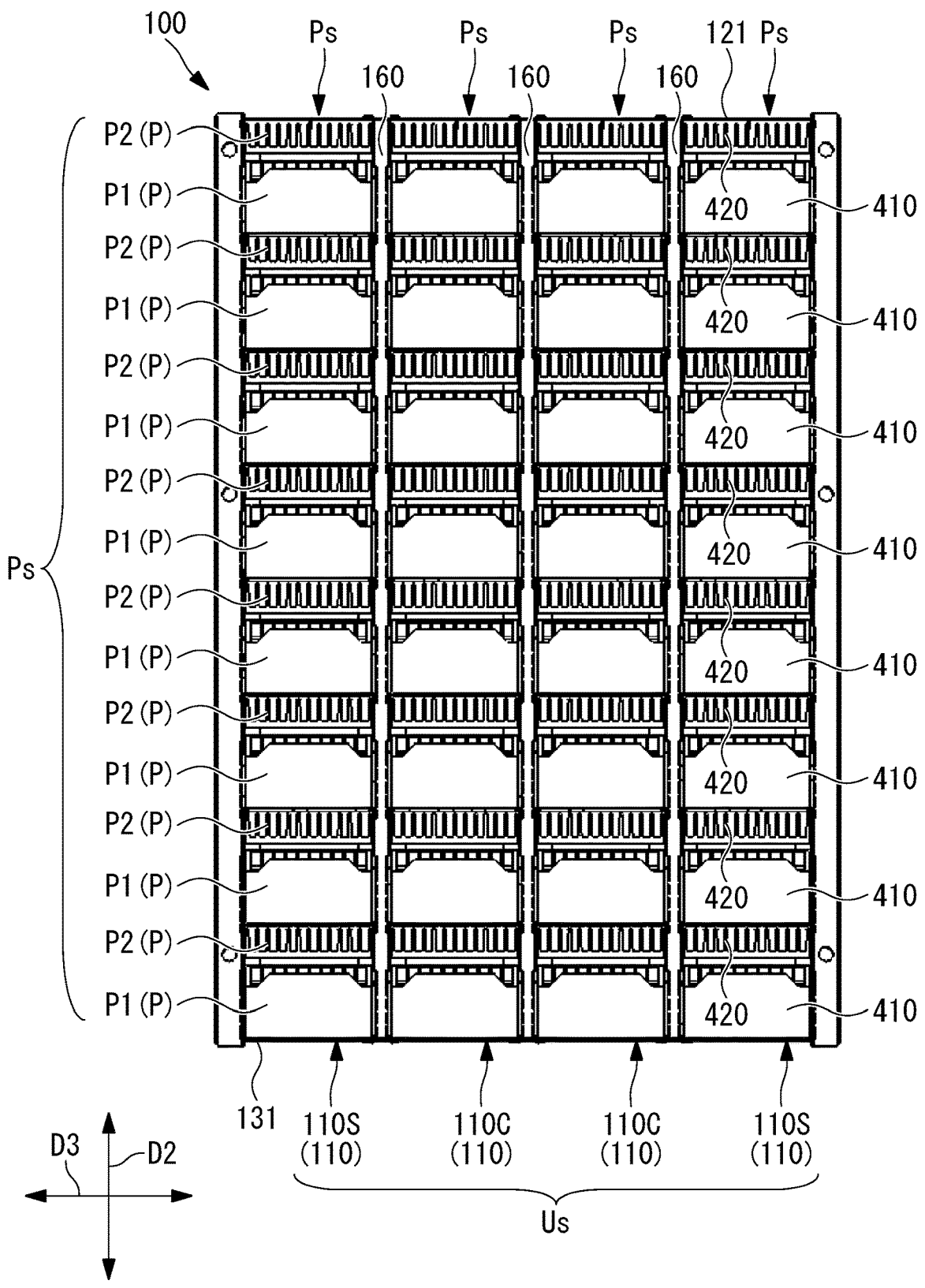
FIG. 6 is a front view of the cage (an EMI finger and a cover omitted) according to one embodiment of the present disclosure.

In a single port set Ps, a plurality of first ports P1 and a plurality of second ports P2 are aligned alternatingly in a line in the vertical direction D2 in the order of the second port P2, the first port P1, the second port P2, the first port P1, . . . , the first port P1. In other words, in a single port set Ps, the plurality of first ports P1 and the plurality of second ports P2 are aligned alternatingly in a line in the vertical direction D2 in arrangement such that the second ports P2 are located above the first ports P1. In the case of FIG. 6, in a single port set Ps, eight pairs each consisting of the second port P2 (located above) and the first port P1 (located below) are aligned in a line in the vertical direction D2.

Note that the number of first ports P1 and the number of second ports P2 aligned in the vertical direction D2 can be changed as appropriate in accordance with the required number of ports P.

The clearances 160 between the plurality of port sets Ps are defined by a plurality of vertical units 110 (110S, 110C) aligned with a spacing (clearance 160) therebetween in the horizontal direction D3, a single common top plate 121 attached to the upper edge of all the vertical units 110, and a single common bottom plate 131 attached to the lower edge of all the vertical units 110.

Figure 7:
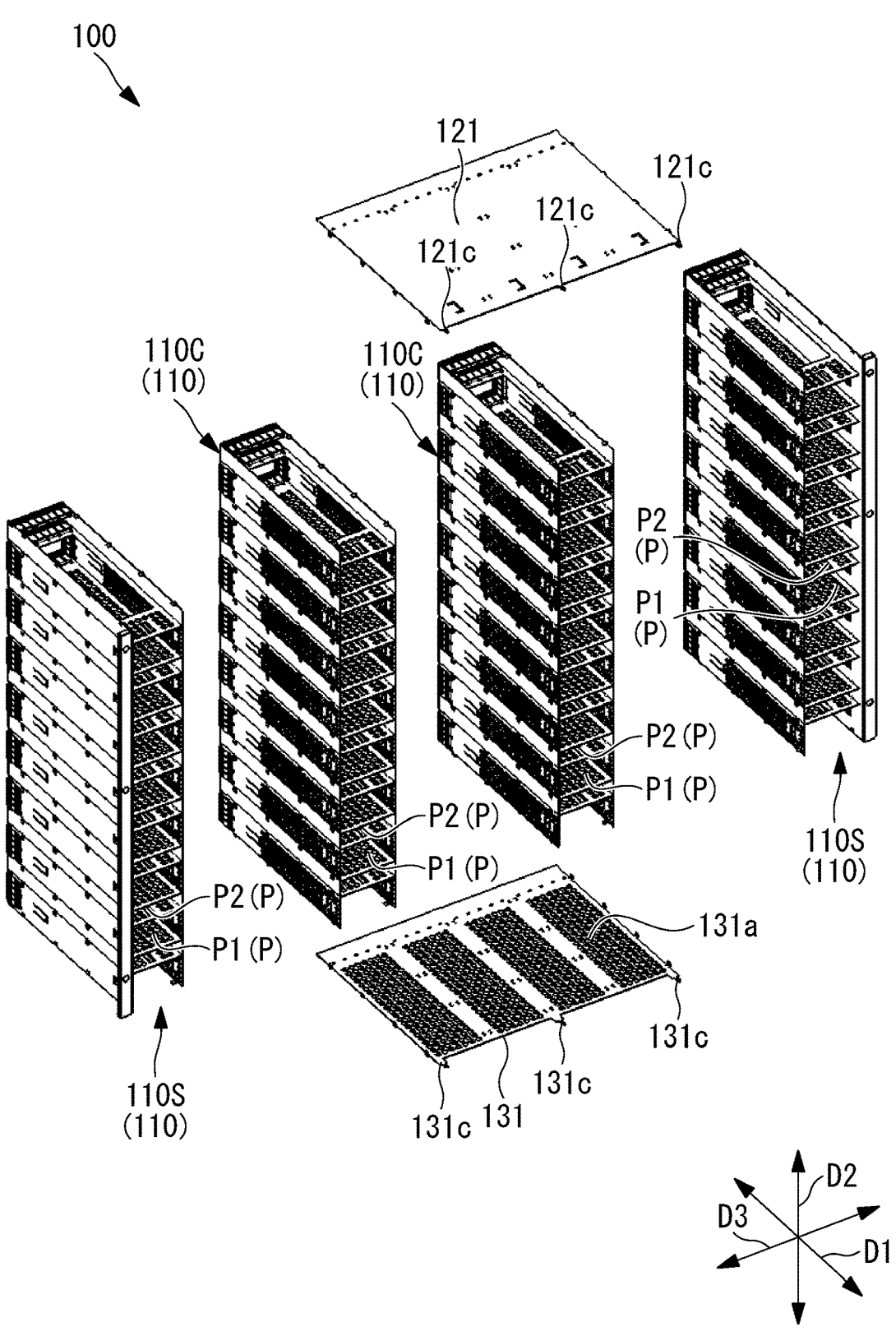
FIG. 7 is an exploded perspective view of the cage according to one embodiment of the present disclosure.

As illustrated in FIG. 7, the plurality of vertical units 110 aligned in the horizontal direction D3 include two vertical units 110S located on both sides in the horizontal direction D3 and at least one (two in the case of the present embodiment) vertical unit 110C located between the vertical units 110S in the horizontal direction D3.

The number of vertical units 110C aligned in the horizontal direction D3 can be changed as appropriate in accordance with the required number of port sets Ps (the number of ports P).

Note that, when the number of port sets Ps aligned in the horizontal direction D3 is two, the vertical unit 110C is not required.

Figure 8:
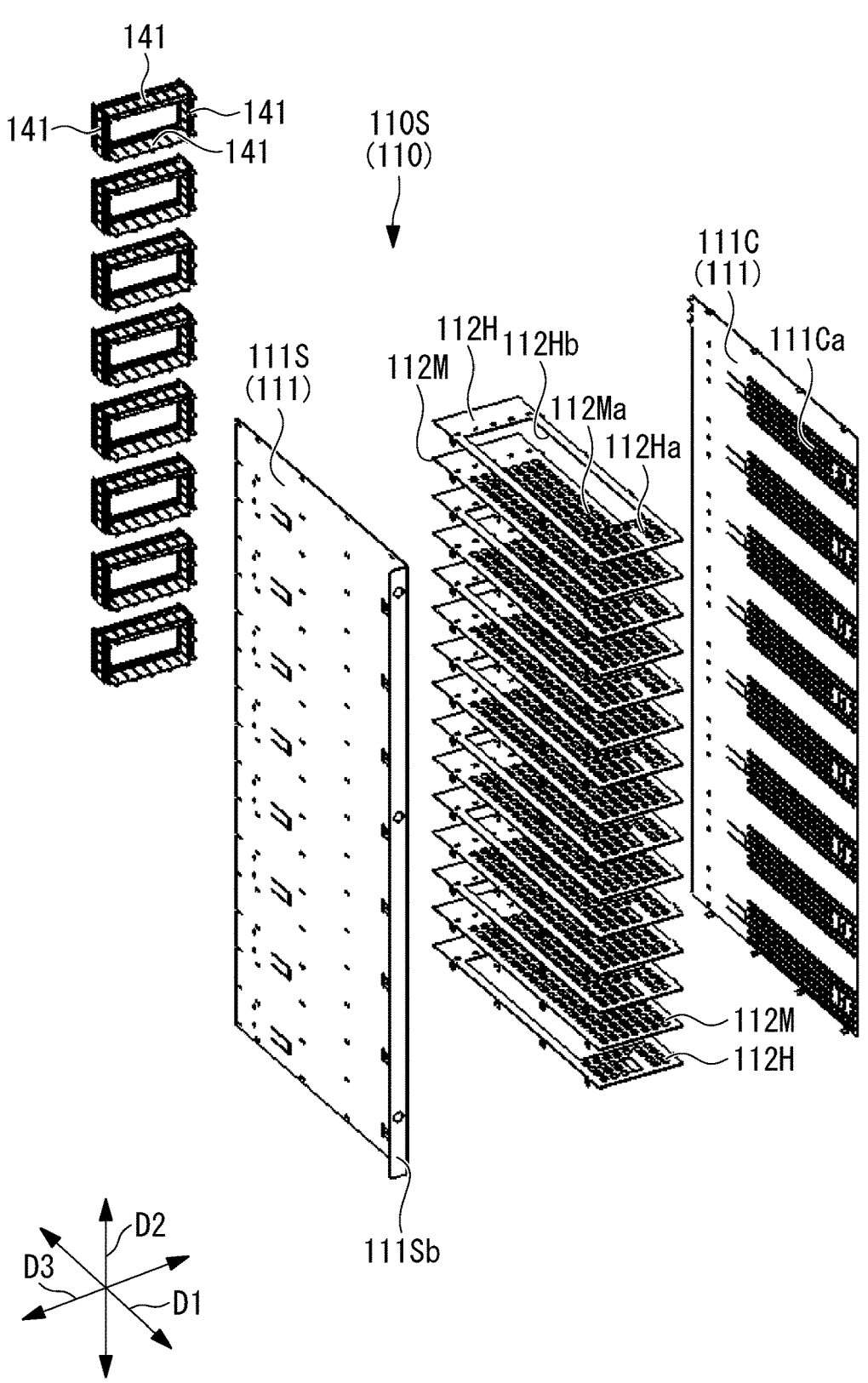
FIG. 8 is a partial exploded perspective view of the cage according to one embodiment of the present disclosure.

As illustrated in FIG. 7 and FIG. 8, each vertical unit 110S has two vertical plates 111 (111S, 111C) aligned with a first spacing therebetween in the horizontal direction D3 and a plurality of horizontal plates 112 (112H, 112M) aligned with a second spacing and/or a third spacing therebetween in the vertical direction D2 and is configured in combination of these plates.

Each vertical plate 111 is a plate extending in the vertical direction D2 and the depth direction D1 and having the thickness in the horizontal direction D3.

The vertical plate 111 has a height dimension over the entire height of the port set Ps.

In the vertical unit 110S, two vertical plates 111 include one vertical plate 111S and one vertical plate 111C.

The vertical plate 111S is also a side plate forming the side face of the cage 100 and is located outermost in the horizontal direction D3 in the cage 100. Therefore, only two vertical plates 111S are attached to the cage 100.

A flange 111Sb used when the cage 100 is fixed to the circuit board 200 may be provided on the rear edge of the vertical plate 111S (see FIG. 1).

The vertical plate 111C is the vertical plate 111 other than the vertical plates 111S.

The vertical plate 111S and the vertical plate 111C are arranged so as to face each other with a first spacing therebetween in the horizontal direction D3. The "first spacing" used herein is a spacing/distance corresponding to the width of a single port P (the first port P1 and the second port P2).

Each horizontal plate 112 is a plate extending in the horizontal direction D3 and the depth direction D1 and having a thickness in the vertical direction D2.

The horizontal plate 112 has a width dimension over the width of a single port P.

The horizontal plate 112 is arranged between the vertical plate 111S and the vertical plate 111C, and edges in the horizontal direction D3 (two edges along the depth direction D1) are fixed to the vertical plate 111S and the vertical plate 111C. For example, the horizontal plate 112 is fixed to the vertical plate 111S by inserting a plurality of protrusions provided on the edge of the horizontal plate 112 into slits formed in the vertical plate 111 and then bending each protrusion. However, a fixing method other than the above may be employed.

The plurality of horizontal plates 112 include a plurality of horizontal plates 112H and a plurality of horizontal plates 112M.

In a single vertical unit 110S, a plurality of horizontal plates 112H and a plurality of horizontal plates 112M are aligned alternatingly in a line in the vertical direction D2 in the order of the horizontal plate 112H, the horizontal plate 112M, the horizontal plate 112H, the horizontal plate 112M, . . . , the horizontal plate 112H. In the case of FIG. 8, in a single vertical unit 110S, eight horizontal plates 112H and seven horizontal plates 112M are aligned alternatingly in a line in the vertical direction D2.

As illustrated in FIG. 6, each horizontal plate 112H is a plate on which the heat sink 420 is placed. As illustrated in FIG. 8, a through-opening 112Hb is formed in each horizontal plate 112H. The through-opening 112Hb is an opening connecting the second port P2 and the first port P1 spaced apart by the horizontal plate 112H. Accordingly, the heat sink 420 accommodated in the second port P2 (in detail, a protruding part provided on the bottom face of the heat sink 420) enters the first port P1 via the through-opening 112Hb and then comes into contact with the optical module 410 accommodated in the first port P1.

As illustrated in FIG. 6, the horizontal plate 112M is a plate on which the optical module 410 is placed. Note that, in the lowermost level of the vertical unit 110S, the bottom plate 131 functions as the eighth horizontal plate 112M.

The horizontal plate 112H and the horizontal plate 112M are arranged so as to face each other with the second spacing and/or the third spacing therebetween in the vertical direction D2. In detail, the horizontal plate 112H and the horizontal plate 112M are arranged so as to face each other with the second spacing therebetween in the vertical direction D2 in a relationship in which the horizontal plate 112H is located above and the horizontal plate 112M is located below, and the horizontal plate 112H and the horizontal plate 112M are arranged so as to face each other with the third spacing therebetween in the vertical direction D2 in a relationship in which the horizontal plate 112H is located below and the horizontal plate 112M is located above. The "second spacing" as used herein is a spacing/distance corresponding to the height of a single first port P1, and the "third spacing" as used herein is a spacing/distance corresponding to the height of a single second port P2.

Figure 9:
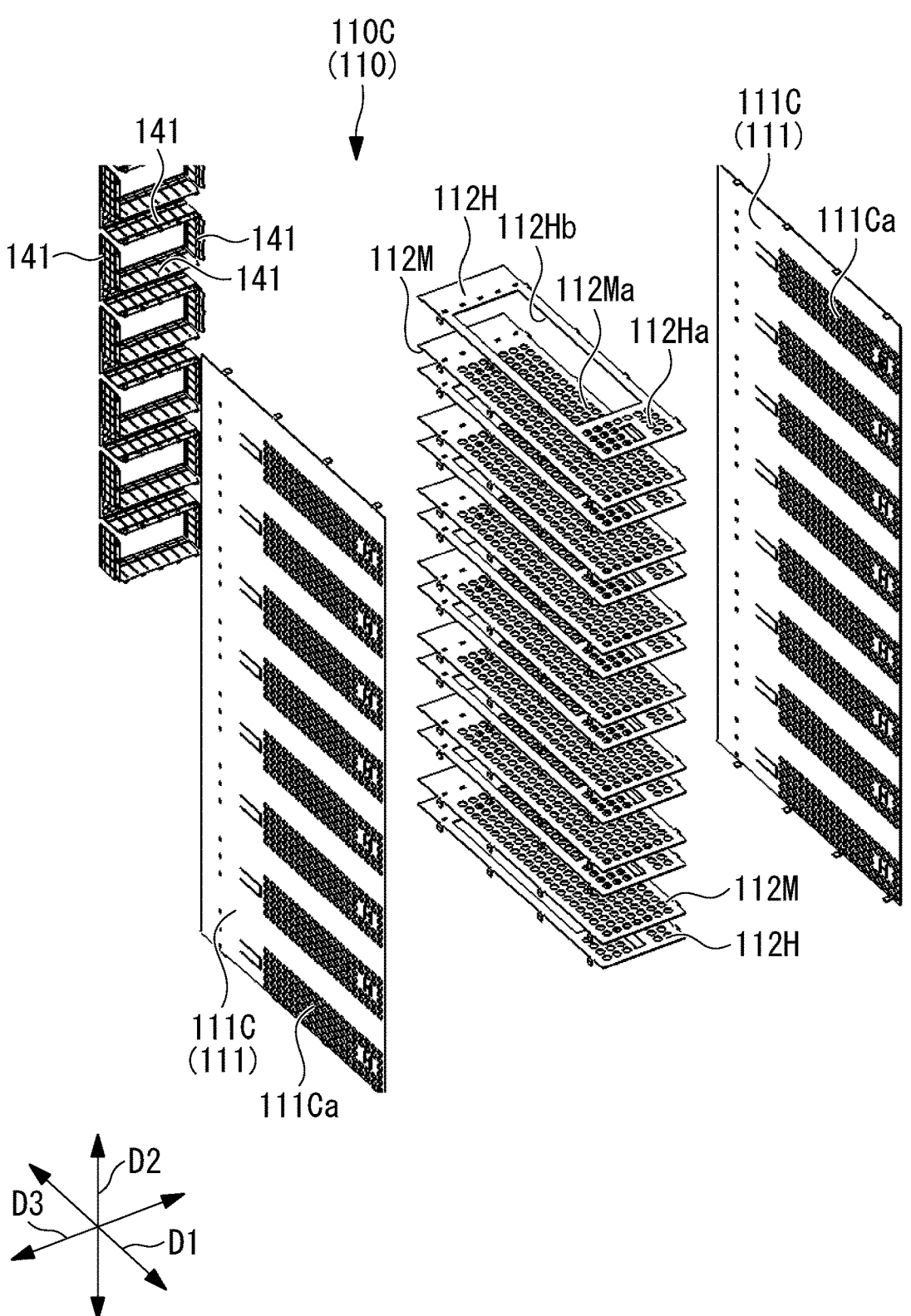
FIG. 9 is a partial exploded perspective view of the cage according to one embodiment of the present disclosure.

As illustrated in FIG. 7 and FIG. 9, each vertical unit 110C has two vertical plates 111 (111C) aligned with the first spacing therebetween in the horizontal direction D3 and the plurality of horizontal plates 112 (112H, 112M) aligned with the second spacing and/or the third spacing therebetween in the vertical direction D2 and is configured in combination of these plates.

The vertical plates 111C are arranged so as to face each other with the first spacing therebetween in the horizontal direction D3.

Other configurations of the vertical unit 110C than the above are the same as those of the vertical unit 110S. Accordingly, detailed description of the vertical unit 110C will be omitted here.

Figure 5:
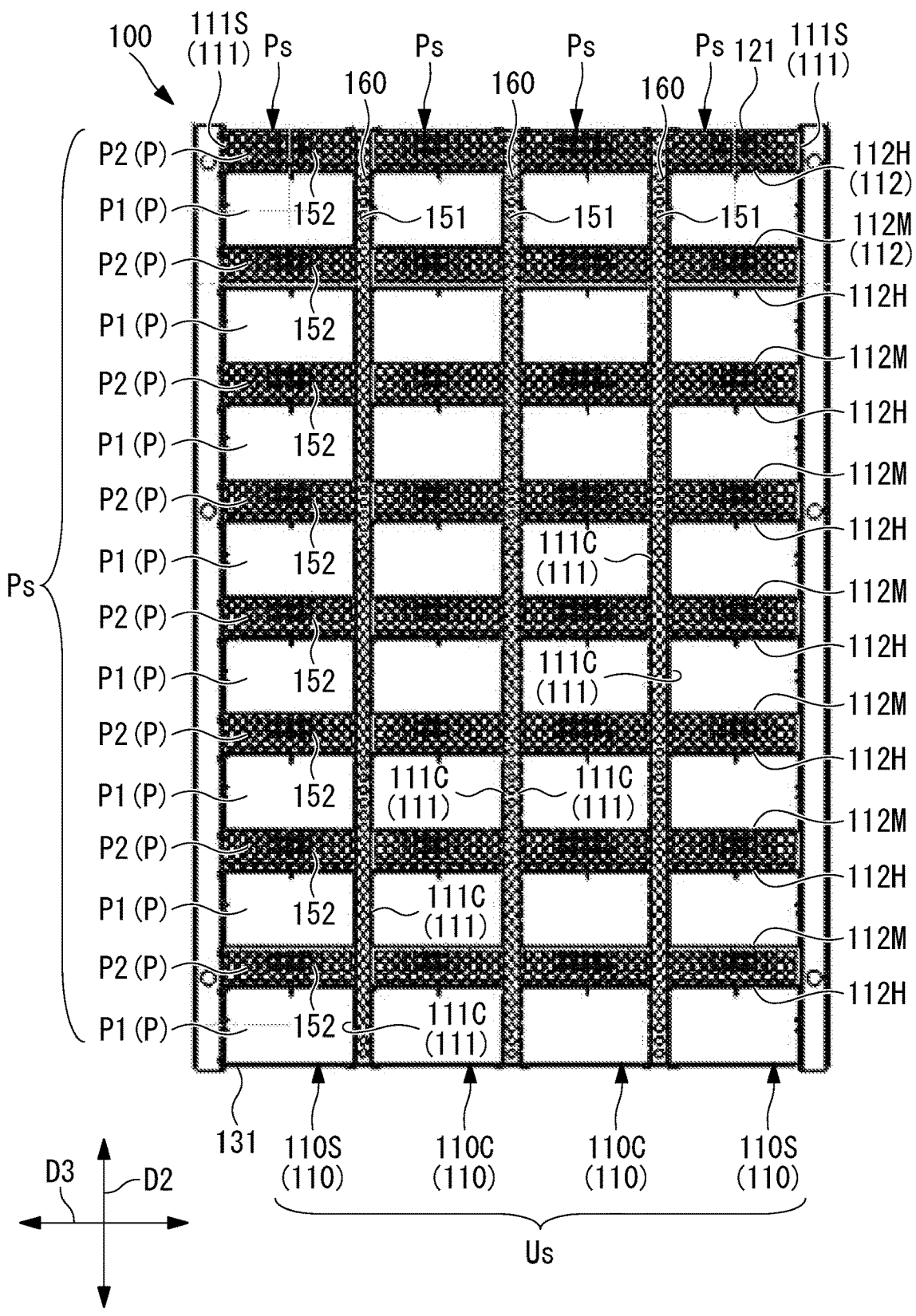
FIG. 5 is a front view of the cage according to one embodiment of the present disclosure.

As illustrated in FIG. 5 and FIG. 6, the vertical unit 110S and the vertical unit 110C configured as above are aligned in a state where at least one (two in the case of the present embodiment) vertical unit 110C is arranged between two vertical units 110S located on both sides in the horizontal direction D3 and where the vertical unit 110S and the vertical unit 110C are spaced from each other with the spacing (clearance 160) therebetween in the horizontal direction D3.

In the plurality of vertical units 110 aligned with a spacing (clearance 160) therebetween in the horizontal direction D3 (hereafter, also referred to as "unit set Us"), a single common top plate 121 is fixed to upper edges of the two vertical plates 111 included in each vertical unit 110, and a single common bottom plate 131 is fixed to lower edges of two vertical plates 111 included in each vertical unit 110. For example, the vertical plate 111 is fixed to the top plate 121 by inserting a plurality of protrusions provided on the upper edge of the vertical plate 111 into slits formed in the top plate 121 and then bending each protrusion. Further, for example, the vertical plate 111 is fixed to the bottom plate 131 by inserting a plurality of protrusions provided on the lower edge of the vertical plate 111 into slits formed in the bottom plate 131 and then bending each protrusion. However, a fixing method other than the above may be employed.

As illustrated in FIG. 7, the top plate 121 and the bottom plate 131 each are a plate extending in the horizontal direction D3 and the depth direction D1 and having a thickness in the vertical direction D2.

The top plate 121 and the bottom plate 131 each have a width dimension over the entire width of the unit set Us (from one vertical plate 111S to the other vertical plate 111S).

Accordingly, as illustrated in FIG. 5 and FIG. 6, the unit set Us is integrated, and the plurality of port sets Ps including the plurality of first ports P1 and the plurality of second ports P2 and the clearance 160 between the port sets Ps are defined.

In detail, the first ports P1 on the lowermost level aligned in the horizontal direction D3 (four first ports P1 in the case of the present embodiment) are defined by the horizontal plate 112H above, two vertical plates 111 on the left and right, and the bottom plate 131 below. Further, other first ports P1 are defined by the horizontal plate 112H above, two vertical plates 111 on the left and right, and the horizontal plate 112M below.

Furthermore, the second ports P2 on the uppermost level aligned in the horizontal direction D3 (four second ports P2 in the case of the present embodiment) are defined by the top plate 121 above, two vertical plates 111 on the left and right, and the horizontal plate 112H below. Further, other second ports P2 are defined by the horizontal plate 112M above, two vertical plates 111 on the left and right, and the horizontal plate 112H below.

Furthermore, each clearance 160 is defined by two vertical plates 111C on the left and right, the top plate 121 above, and the bottom plate 131 below. Note that two vertical plates 111C defining each clearance 160 (two vertical plates 111C facing each other interposing each clearance 160) belong to different vertical units 110. Specifically, the first vertical plate 111C is included in one vertical unit 110 (first vertical unit 110), and the second vertical plate 111C is included in another vertical unit 110 (second vertical unit 110) adjacent to the first vertical unit 110.

As described above, the first port P1 is a space for accommodating the optical module 410, and the second port P2 is a space for accommodating the heat sink 420. In contrast, the clearance 160 is a mere space accommodating no external device such as the optical module 410 or the heat sink 420.

Each port P and each clearance 160 penetrate through in the depth direction D1. Thus, walls defining each port P and each clearance 160 (walls formed of four plates above, below, left, and right) form a bottomless rectangular cylinder.

In each port P and each clearance 160 penetrating through in the depth direction D1, an opening facing the circuit board 200 is referred to as a "rear opening" (see FIG. 4), and an opening opposite to the rear opening is referred to as a "front opening" (see FIG. 6).

Figure 10:
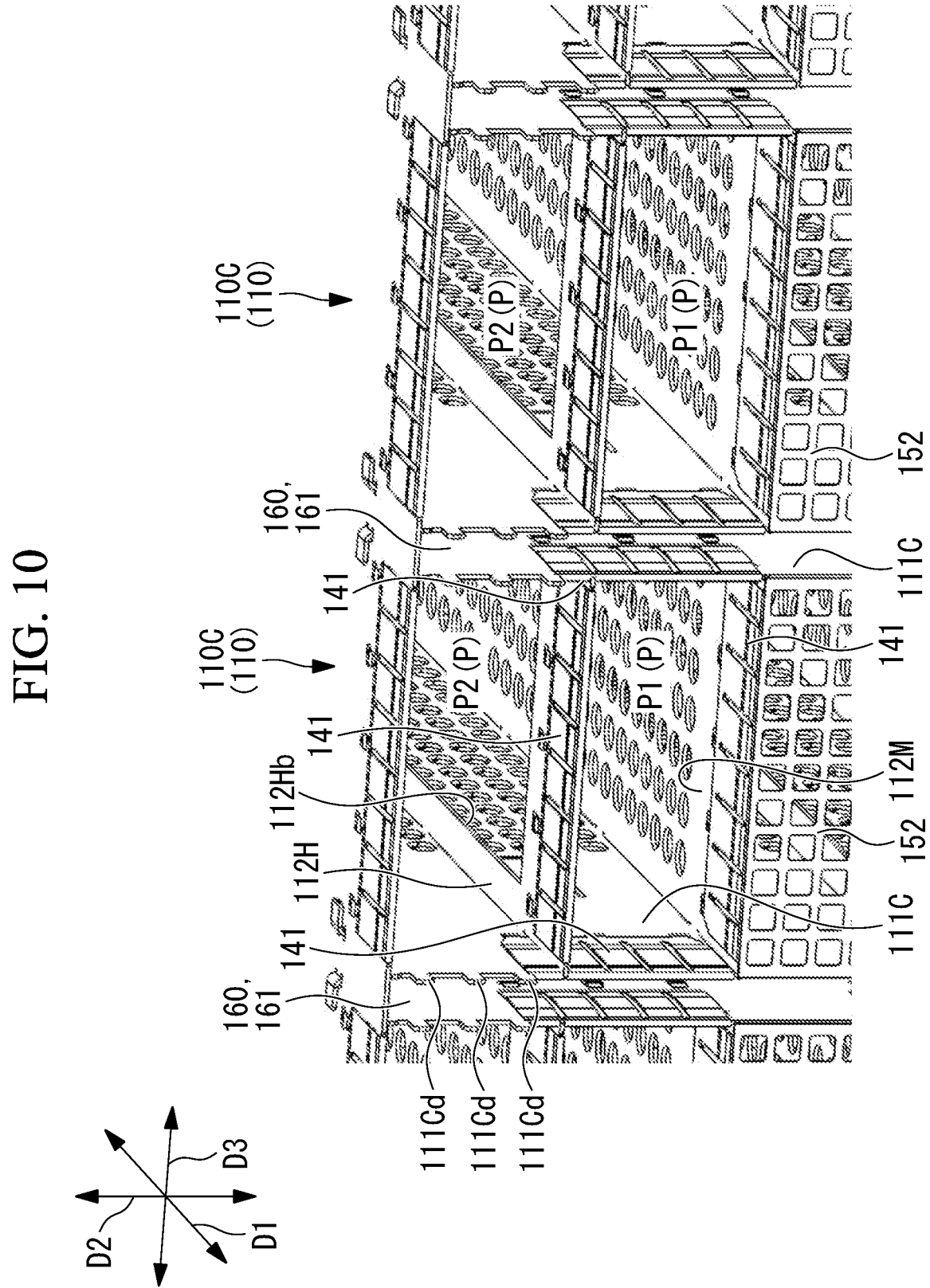
FIG. 10 is a partial front perspective view of the cage (a front cover omitted) according to one embodiment of the present disclosure.

As illustrated in FIG. 10, EMI fingers 141 are attached to four edges forming the peripheral of the front opening of the first port P1.

Each EMI finger 141 is attached to each wall (each plate) defining the first port P1 so as to interpose and pinch the wall.

This can improve the shield property against noise leaking from a gap between the first port P1 and the optical module 410.

The cage 100 described above achieves the following advantageous effects.

The vertical plate 111 functions as a wall in the vertical direction D2 of the port set Ps (that is, a wall in the vertical direction D2 shared by all the ports P aligned in a line in the vertical direction D2) and the horizontal plate 112 functions as a wall in the horizontal direction D3 of each port P included in the port set Ps, and therefore the width dimension of the horizontal plate 112 can be substantially the same as the width dimension of a single port P. Thus, the width dimension of the horizontal plate 112 can be minimized. This makes the horizontal plate 112 less likely to bend in the vertical direction D2. In particular, in the cage 100 of the present embodiment into which external devices are inserted perpendicularly to the circuit board 200, it is important to reduce the amount of bending of the horizontal plate 112 on which the external devices are placed.

Further, the port set Ps consisting of a plurality of ports P aligned in a line in the vertical direction D2 can be unitized as the vertical unit 110. Accordingly, only by changing the number of vertical units 110 aligned in the horizontal direction D3, it is possible to increase or reduce the number of ports P/port sets Ps in a simple manner.

Further, the clearance 160 as a space accommodating no external device is defined between the vertical units 110 and the clearance 160 has the rear opening and the front opening. It is thus possible to use the clearance 160 as a flow path and cause cooling air to flow from the front opening to the rear opening, for example. Thus, the external device accommodated in the port P can be cooled by air flowing in the clearance 160 adjacent to the port P. Further, since the external devices can be forcibly spaced from each other in the horizontal direction D3, this can realize a structure in which heat is less likely to be retained.

Further, the top plate 121 is fixed to the upper edge of each vertical plate 111 of the plurality of vertical units 110 included in the unit set Us over the entire width in the horizontal direction D3 of the unit set Us, and the bottom plate 131 is fixed to the bottom edge of each vertical plate 111 of the plurality of vertical units 110 included in the unit set Us over the entire width in the horizontal direction D3 of the unit set Us. Thus, only by preparing the top plates 121 and the bottom plates 131 having different sizes (specifically, different dimensions in the horizontal direction D3) without changing the configuration of the vertical units 110, it is possible to configure the cage 100 in which any number of vertical units 110 are aligned in the horizontal direction D3. Accordingly, it is possible to easily expand variations of the cage 100 with different numbers of ports P.

Connecting Hole

A connecting hole for a smooth flow of cooling air is formed in each plate.

Specifically, as illustrated in FIG. 8 and FIG. 9, a plurality of connecting holes 111Ca are formed in the vertical plate 111C, a plurality of connecting holes 112Ha are formed in the horizontal plate 112H, and a plurality of connecting holes 112Ma are formed in the horizontal plate 112M. Further, as illustrated in FIG. 7, a plurality of connecting holes 131a are formed in the bottom plate 131.

As illustrated in FIG. 8 and FIG. 9, the plurality of connecting holes 111Ca are formed in ranges of the vertical plate 111C corresponding to positions of the first ports P1.

This can facilitate cooling of the optical module 410 accommodated in each first port P1.

The plurality of connecting holes 112Ha are formed in a range of the horizontal plate 112H rearward from through-openings 112Hb.

This can facilitate cooling of the optical module 410 and the heat sink 420.

A plurality of connecting holes 112Ma are formed in substantially the entire range of the horizontal plate 112M.

This can facilitate cooling of the optical module 410 and the heat sink 420.

As illustrated in FIG. 7, a plurality of connecting holes 131a are formed in ranges of the bottom plate 131 corresponding to positions of the first ports P1.

This can facilitate cooling of the optical module 410 accommodated in each first port P1.

Front Plate

In the following description, the front opening of the clearance 160 is particularly defined as a "clearance front opening 161".

Figure 11:
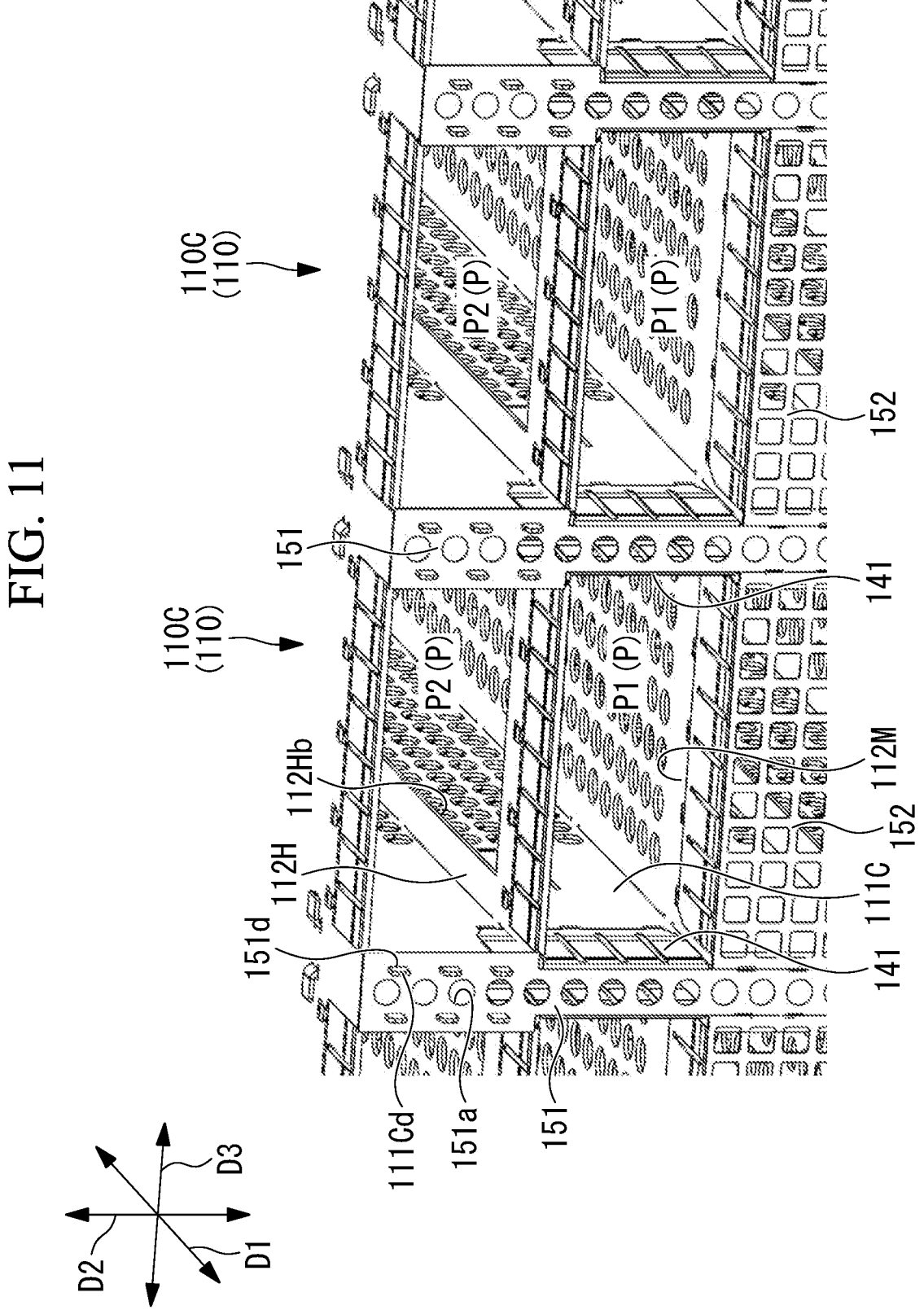
FIG. 11 is a partial front perspective view of the cage according to one embodiment of the present disclosure.

As illustrated in FIG. 5 and FIG. 11, front plates 151 for closing the clearance front openings 161 are attached to the cage 100.

Each front plate 151 is a plate elongated in the vertical direction D2 corresponding to the shape of the clearance front opening 161.

The size and the shape of the front plate 151 are designed so as not to interfere with an external device when the external device is inserted into each port P.

As illustrated in FIG. 10 and FIG. 11, a plurality of protrusions 111Cd are provided on each vertical plate 111C.

Each protrusion 111Cd is a U-shaped portion protruding forward from the front edge of the vertical plate 111C and along the depth direction D1 and is provided in a range of the vertical plate 111C to which no EMI finger 141 is attached, that is, in a range of the vertical plate 111C corresponding to the lateral side of the second port P2.

As illustrated in FIG. 11, a plurality of slits 151d are formed in the front plate 151 and configured such that the protrusions 111Cd of two vertical plates 111C facing each other interposing the clearance 160 are inserted into the slits 151d.

Each protrusion 111Cd of the two vertical plates 111C is inserted into each slit 151d of a single front plate 151, and thereby the front plate 151 is fixed to the front edge of the vertical plate 111C. At the same time, two adjacent vertical units 110 including two vertical plates 111C fixed by a single front plate 151 are rigidly coupled to each other. Further, two vertical plates 111C fixed by the single front plate 151 are less likely to bend in the horizontal direction D3.

Note that the protrusions 111Cd may be bent after the protrusions 111Cd are inserted into the slits 151d.

A plurality of connecting holes 151a are formed in the front plate 151.

Each connecting hole 151a is a penetrating hole and connects the clearance 160 to outside in a state where the front plate 151 is attached to the cage 100.

The plurality of connecting holes 151a are aligned in a line in the vertical direction D2, for example.

This allows cooling air to easily flow into the clearance 160 via the connecting holes 151a even after the front plate 151 is attached.

The front plate 151 is made of metal, for example.

When the front plate 151 is attached to the cage 100, the front plate 151 is in contact with the EMI fingers 141 in a range in which the EMI fingers 141 are attached, that is, in a range corresponding to the lateral side of the first port P1.

This can further improve the shield property against noise leaking from a gap between the first port P1 and the optical module 410.

Note that the second front plate 152 for closing the front opening of each second port P2 may be attached to the cage 100.

Variation 1 of Port/Port Set

Figure 12:
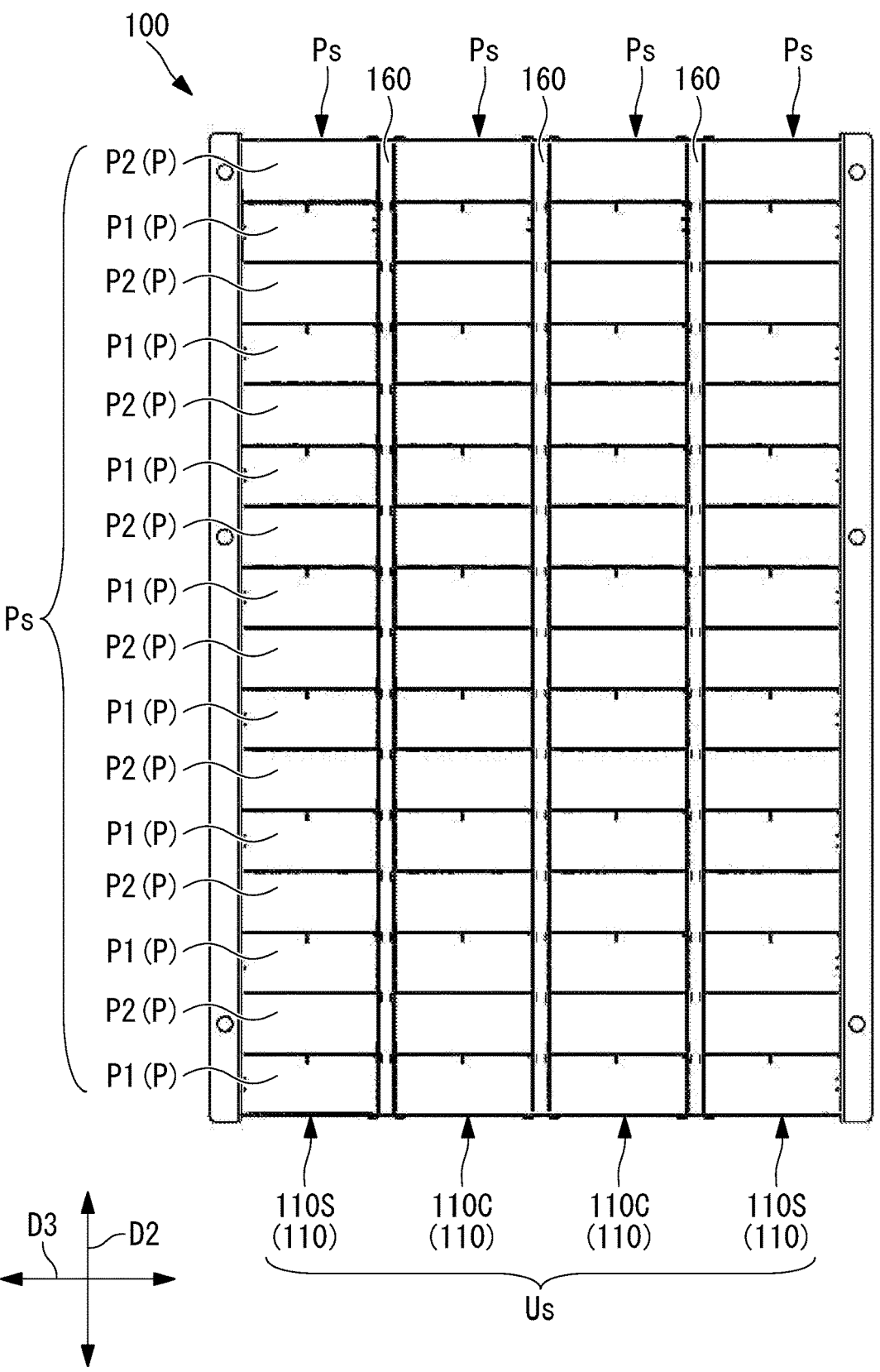
FIG. 12 is a front view of a cage according to another example of one embodiment of the present disclosure (the external device omitted).
Figure 13:
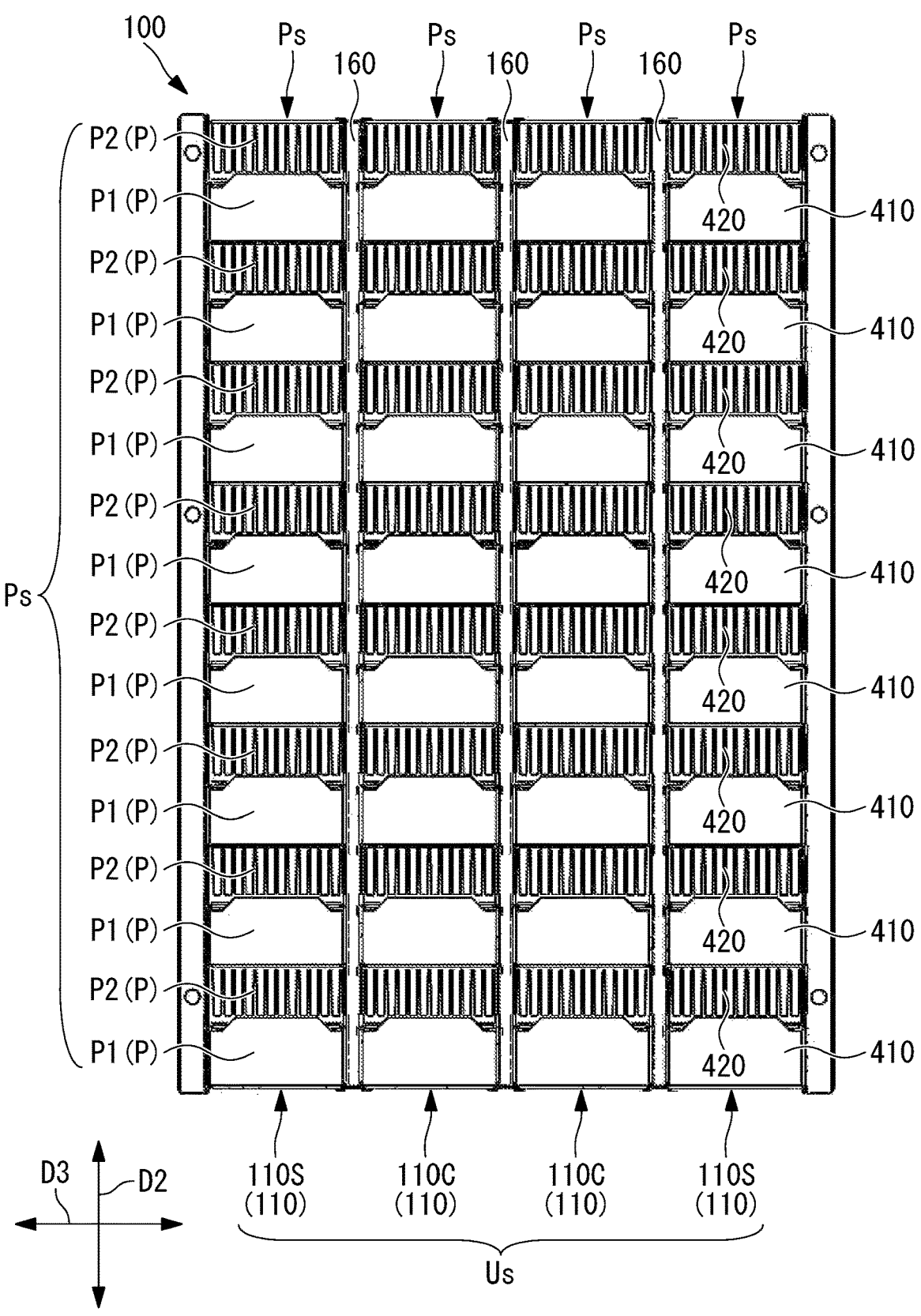
FIG. 13 is a front view of a case according to another example of one embodiment of the present disclosure.
Figure 14:
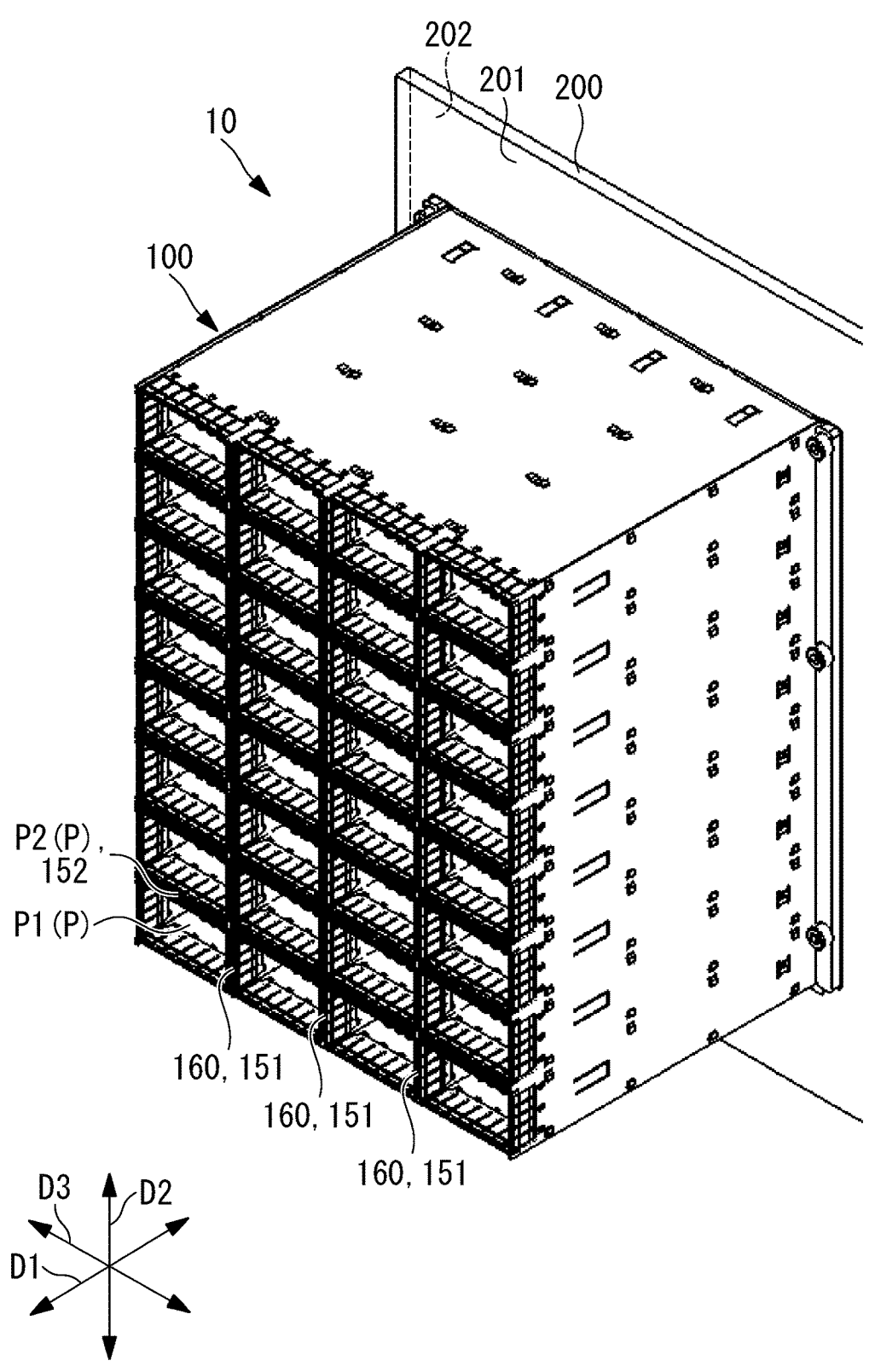
FIG. 14 is a perspective view of a cage assembly according to still another example of one embodiment of the present disclosure.

As illustrated in FIG. 12 and FIG. 13 in comparison to FIG. 5 and FIG. 6, the size of the first port P1 and the size of the second port P2 can be changed as appropriate in accordance with the size of the external device (the optical module 410 or the heat sink 420).

Variation 2 of Port/Port Set

As illustrated in FIG. 14 to FIG. 17, the port set Ps may also be configured as follows.

Specifically, in a single port set Ps, a plurality of first ports P1 and a plurality of second ports P2 are aligned alternatingly in a line in the vertical direction D2 in the order of the first port P1, the second port P2, the first port P1, the second port P2, . . . , the first port P1. In other words, in a single port set Ps, the plurality of first ports P1 and the plurality of second ports P2 are aligned alternatingly in a line in the vertical direction D2 in arrangement such that the second port P2 is interposed between one first port P1 and another first port P1 adjacent to each other in the vertical direction D2.

In the case of such a port set Ps, an IHS type optical module 410 in which a heat sink is embedded in advance is accommodated in each first port P1.

In contrast, no heat sink 420 is accommodated in each second port P2. Thus, the second port P2 is a mere space.

However, such a space facilitates heat dissipation of the optical module 410. Thus, such a space serves for efficient cooling of the optical module 410.

Since the heat sink 420 is not placed on the horizontal plate 112H when no heat sink 420 is accommodated in the second port P2, it is not required to provide the through-opening 112Hb in the horizontal plate 112H. However, to improve heat dissipation, a plurality of connecting holes 112Ha may be formed in substantially the entire range of the horizontal plate 112H.

Figure 15:
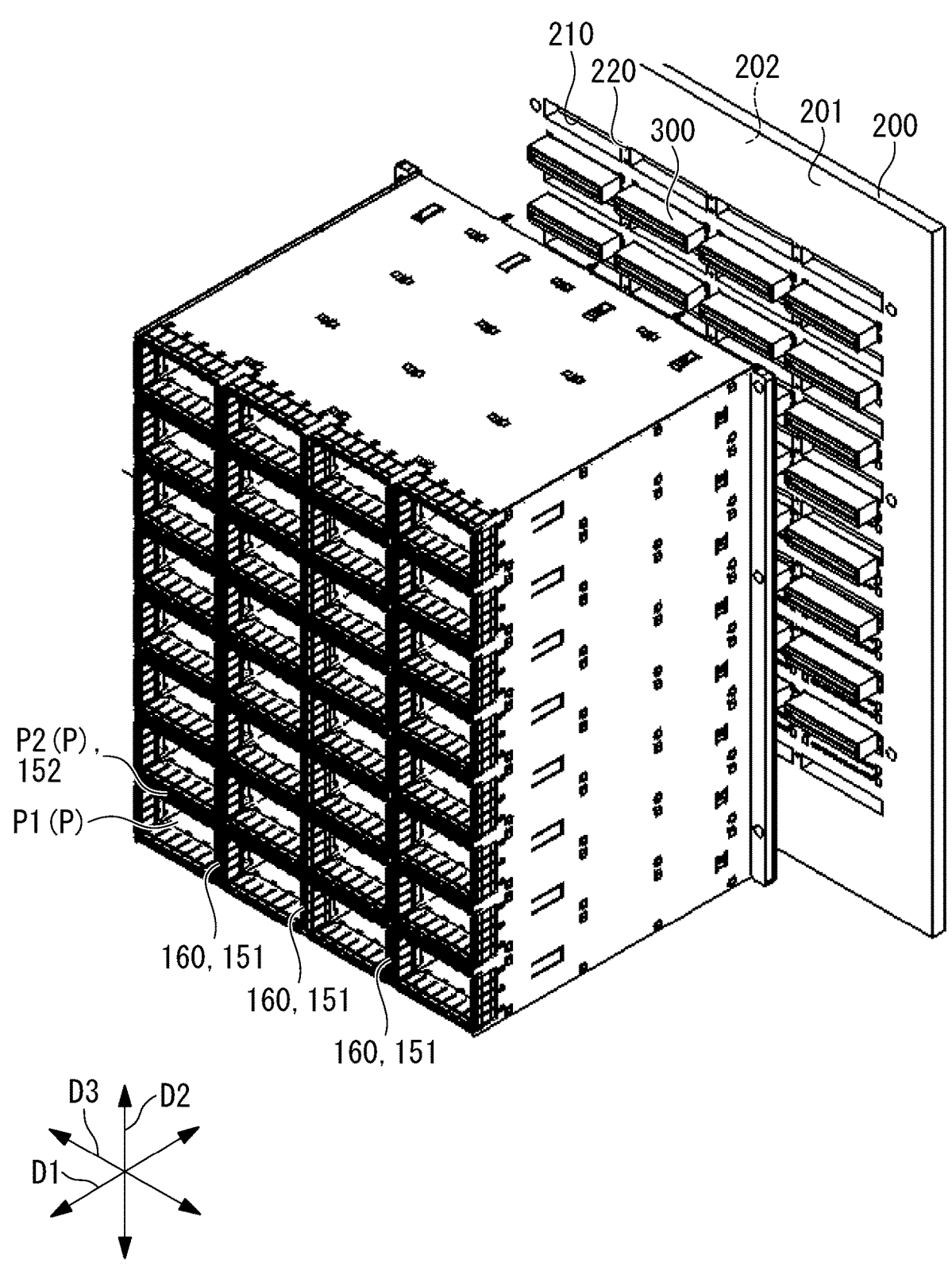
FIG. 15 is an exploded perspective view of the cage assembly according to still another example of one embodiment of the present disclosure.
Figure 16:
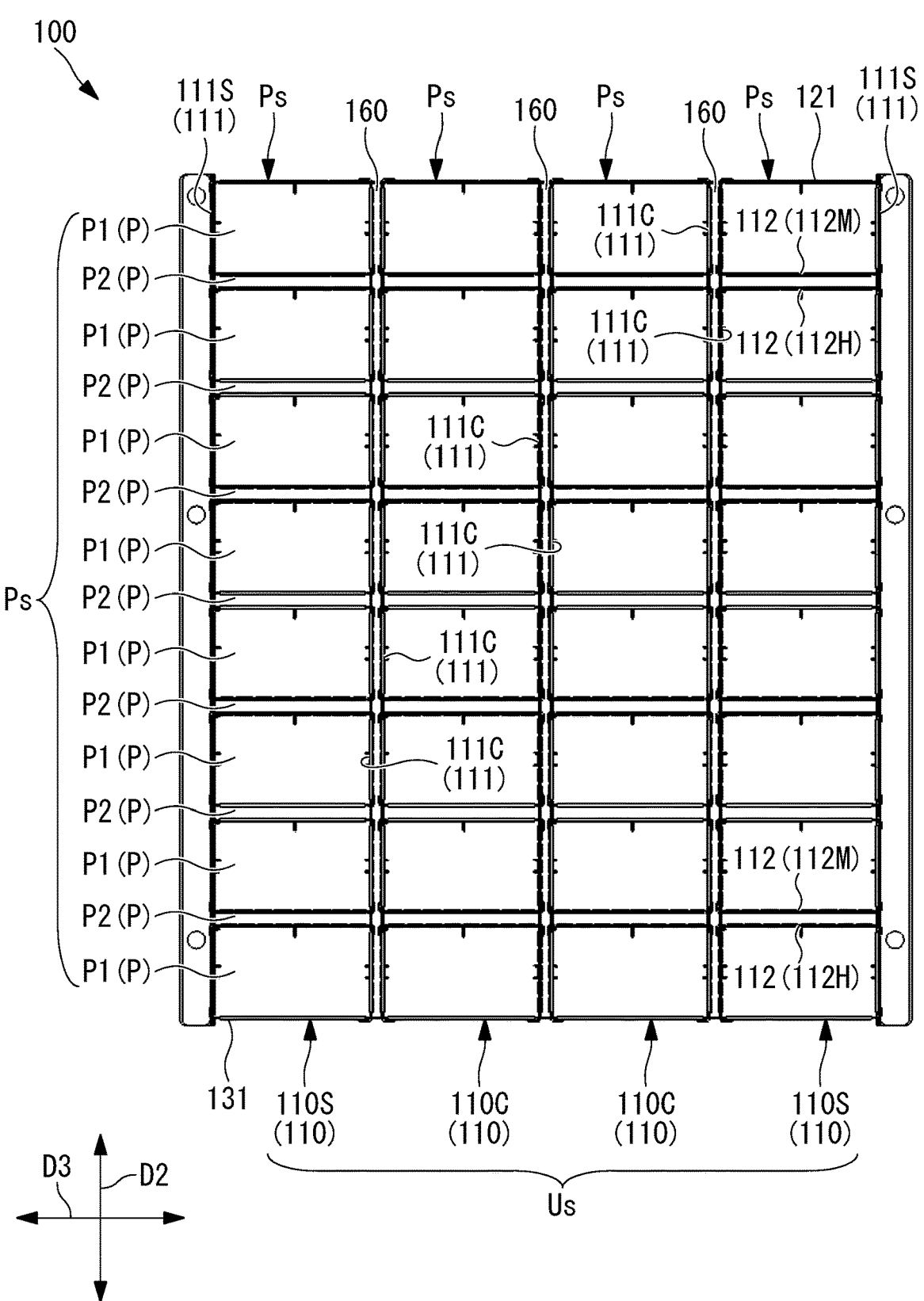
FIG. 16 is a front view of a cage according to still another example of one embodiment of the present disclosure.

Relationship Between Fixing of Cage and Ventilation Opening of Circuit Board As illustrated in FIG. 2 and FIG. 15, a plurality of ventilation openings 210 are formed in the circuit board 200.

Each ventilation opening 210 is an opening penetrating through between the front face 201 and the back face 202 of the circuit board 200.

The position of each ventilation opening 210 corresponds to the position of each second port P2 in which the heat sink 420 is accommodated (see FIG. 2) and/or the position of each first port P1 in which the IHS type optical module 410 is accommodated (see FIG. 15). Thus, respective ventilation openings 210 correspond to respective second ports P2 and/or respective first ports P1 in a one-to-one manner and are aligned in a line with a spacing from each other in the horizontal direction D3.

This allows cooling air that has passed through the heat sinks 420 and/or the heat sinks incorporated in the IHS type optical module 410 to flow out to a region in contact with the back face 202 of the circuit board 200.

While the cage 100 is attached to the circuit board 200 configured as set forth, the cage 100 may be fixed to the circuit board 200 by using a fixing part provided in the rear edge of the vertical plate 111 instead of/in addition to the fixing using the flange 111Sb of the vertical plate 111S described already.

Accordingly, the cage 100 and the circuit board 200 are fixed firmly to each other, and the circuit board 200 is less likely to bend in the depth direction D1 during insertion/extraction of the external device. Further, since vertical plates 111C are fixed by the circuit board 200, each vertical plate 111C is less likely to bend in the horizontal direction D3. Further, since each vertical unit 110 can be positioned to the circuit board 200, ease of assembly of the cage 100 can be improved.

Further, instead of/in addition to the fixing using the flange 111Sb and/or the fixing using the fixing part provided in the vertical plate 111, the cage 100 may be fixed to the circuit board 200 by using a fixing part provided in the rear edge of the top plate 121 and/or the rear edge of the bottom plate 131.

Accordingly, the cage 100 and the circuit board 200 are fixed firmly to each other, and the circuit board 200 is less likely to bend in the depth direction D1 during insertion/extraction of the external device. Further, since the top plate 121 and/or the bottom plate 131 are fixed by the circuit board 200, the top plate 121 and/or the bottom plate 131 are less likely to bend in the vertical direction D2.

Example 1

Figure 17:
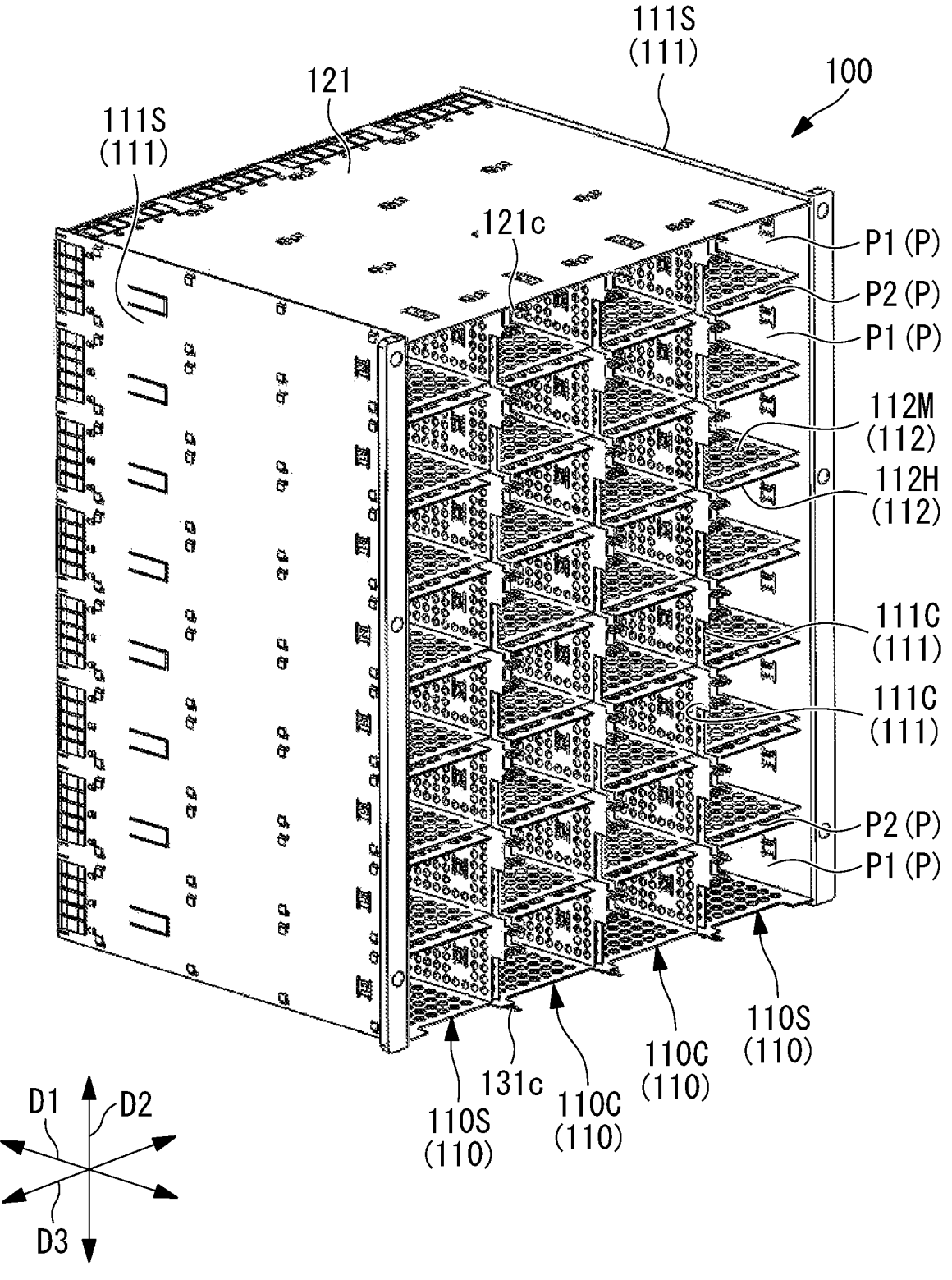
FIG. 17 is a back perspective view of the cage according to still another example of one embodiment of the present disclosure.
Figure 18:
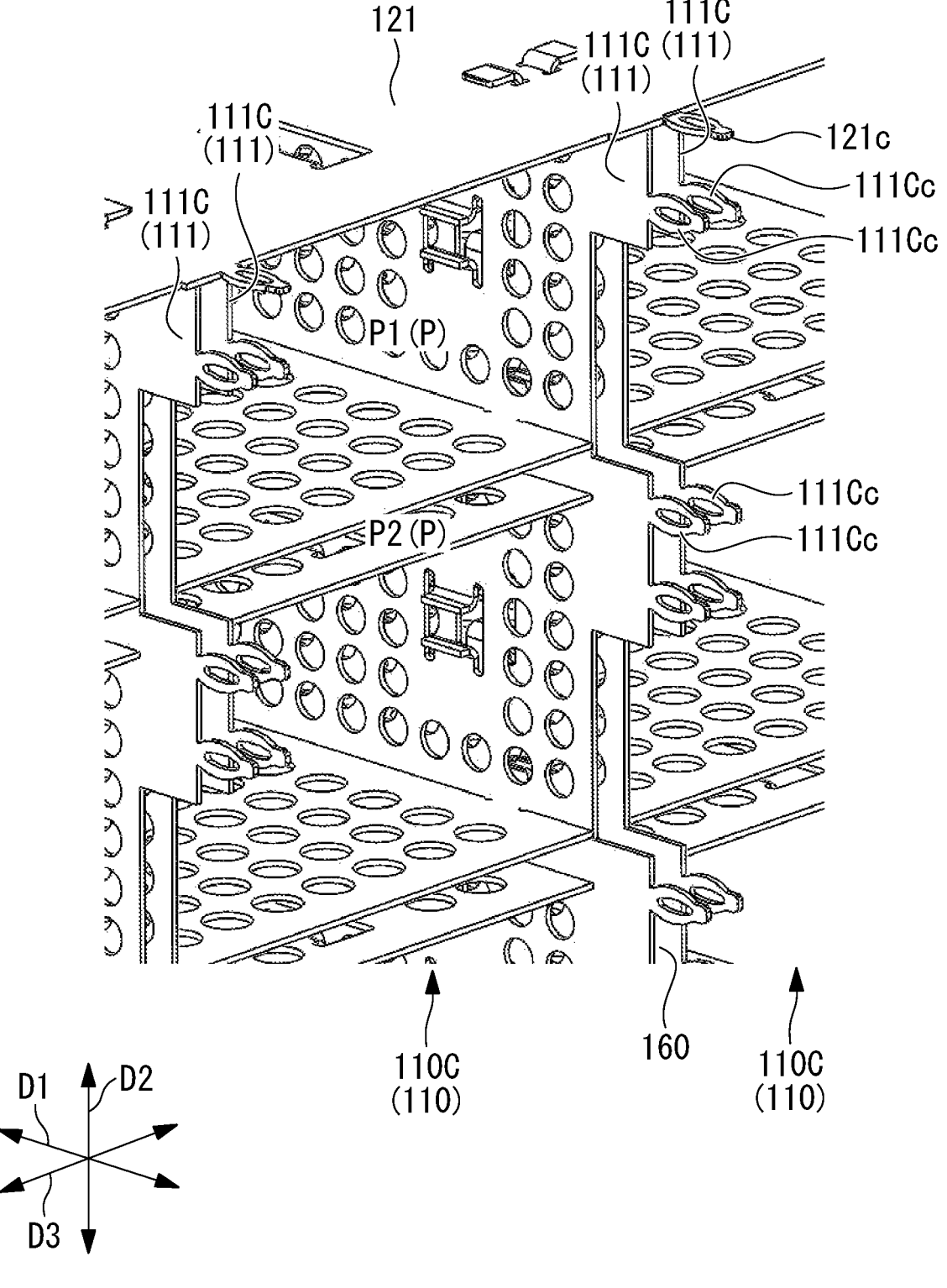
FIG. 18 is a partially enlarged back perspective view of a case according to still another example of one embodiment of the present disclosure (Example 1).

As the fixing part, as illustrated in FIG. 17 and FIG. 18, for example, a plurality of press-fit pins 111Cc provided in each vertical plate 111C, a plurality of press-fit pins 121c provided in the top plate 121, and a plurality of press-fit pins 131c provided in the bottom plate 131 are illustrated as examples.

Each press-fit pin 111Cc is a portion protruding rearward from the rear edge of the vertical plate 111C and along the depth direction D1 and is provided in a range of the vertical plate 111C corresponding to positions of through-holes 220 formed in the circuit board 200 described later. In Example 1, the press-fit pins 111Cc are provided in both two vertical plates 111C facing each other interposing the clearance 160.

Each press-fit pin 121c is a portion protruding rearward from the rear edge of the top plate 121 and along the depth direction D1 and is provided in a range of the top plate 121 corresponding to positions of the through-holes 220 formed in the circuit board 200 described later.

Each press-fit pin 131c is a portion protruding rearward from the rear edge of the bottom plate 131 and along the depth direction D1 and is provided in a range of the bottom plate 131 corresponding to positions of the through-holes 220 formed in the circuit board 200 described later.

Figure 19:
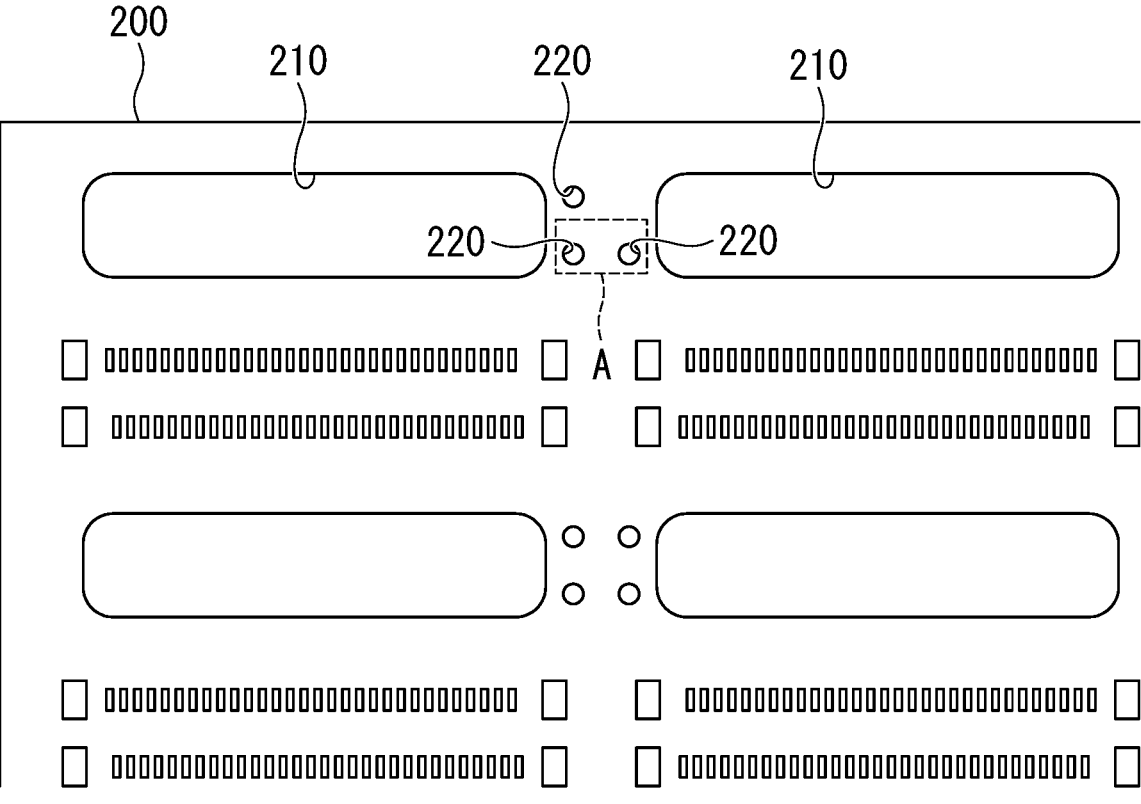
FIG. 19 is a partial enlarged front view of a circuit board (Example 1).
Figure 19:
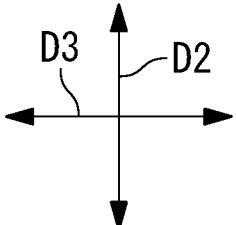

The cage 100 provided with the fixing parts (press-fit pins) as set forth is attached to the circuit board 200 illustrated in FIG. 19.

A plurality of through-holes 220 into which respective press-fit pins are inserted are formed in the circuit board 200 illustrated in FIG. 19.

Each through-hole 220 is arranged between one ventilation opening 210 and another ventilation opening 210 adjacent to each other in the horizontal direction D3. Accordingly, a region used for routing of internal layer wirings can be ensured between one ventilation opening 210 and another ventilation opening 210 adjacent to each other in the vertical direction D2. If through-holes 220 are arranged between ventilation openings 210 adjacent to each other in the vertical direction D2 and, in this case, if the internal layer wirings are routed so as to avoid the through-holes 220, then the region for routing of the internal layer wirings is limited compared to the present embodiment in which no through-hole 220 is arranged between the ventilation openings 210 adjacent to each other in the vertical direction D2.

Figure 20:
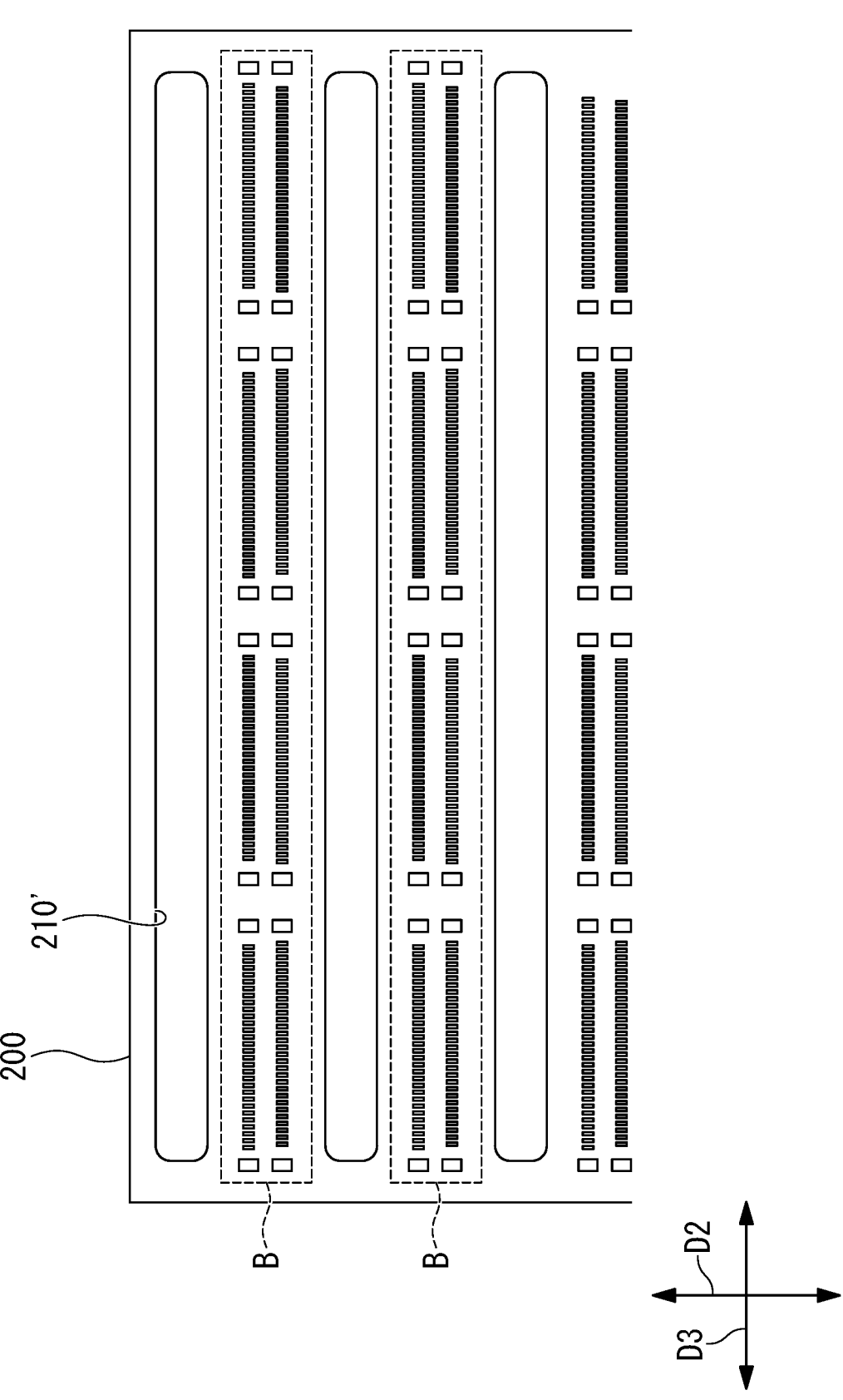
FIG. 20 is a partial enlarged front view of a circuit board as a comparative example.

Further, as illustrated in FIG. 20 as a comparative example, if no through-hole 220 are arranged between one ventilation opening 210 and another ventilation opening 210 adjacent to each other in the horizontal direction D3 and, in this case, if the plurality of ventilation openings 210 aligned in the horizontal direction D3 are integrated (illustrated with a reference 210' in FIG. 20), then the circuit board 200 is likely to bend in the depth direction D1 compared to the present embodiment (see FIG. 19) in which respective ventilation openings 210 correspond to respective second ports P2 and/or respective first ports P1 in a one-to-one manner. This is because portions of the circuit board 200 between the ventilation openings 210' adjacent to each other in the vertical direction D2 (portions B in FIG. 20) are not connected to each other in the vertical direction D2. Nevertheless, if the through-holes 220 are arranged between the ventilation openings 210' adjacent to each other in the vertical direction D2 in order to reduce the amount of bending of the circuit board 200, then the region for routing of the internal layer wirings will be limited as described previously.

Herein, as illustrated in FIG. 18, the press-fit pins 111Cc are provided in both two vertical plates 111C facing each other interposing the clearance 160. Therefore, as illustrated in FIG. 19, at least two through-holes 220 arranged between the ventilation openings 210 are aligned in the horizontal direction D3 (portion A in FIG. 19).

Note that a single through-hole 220 above the portion A in FIG. 19 is the through-hole 220 for the press-fit pin 121c provided in the top plate 121.

Example 2

Figure 21:
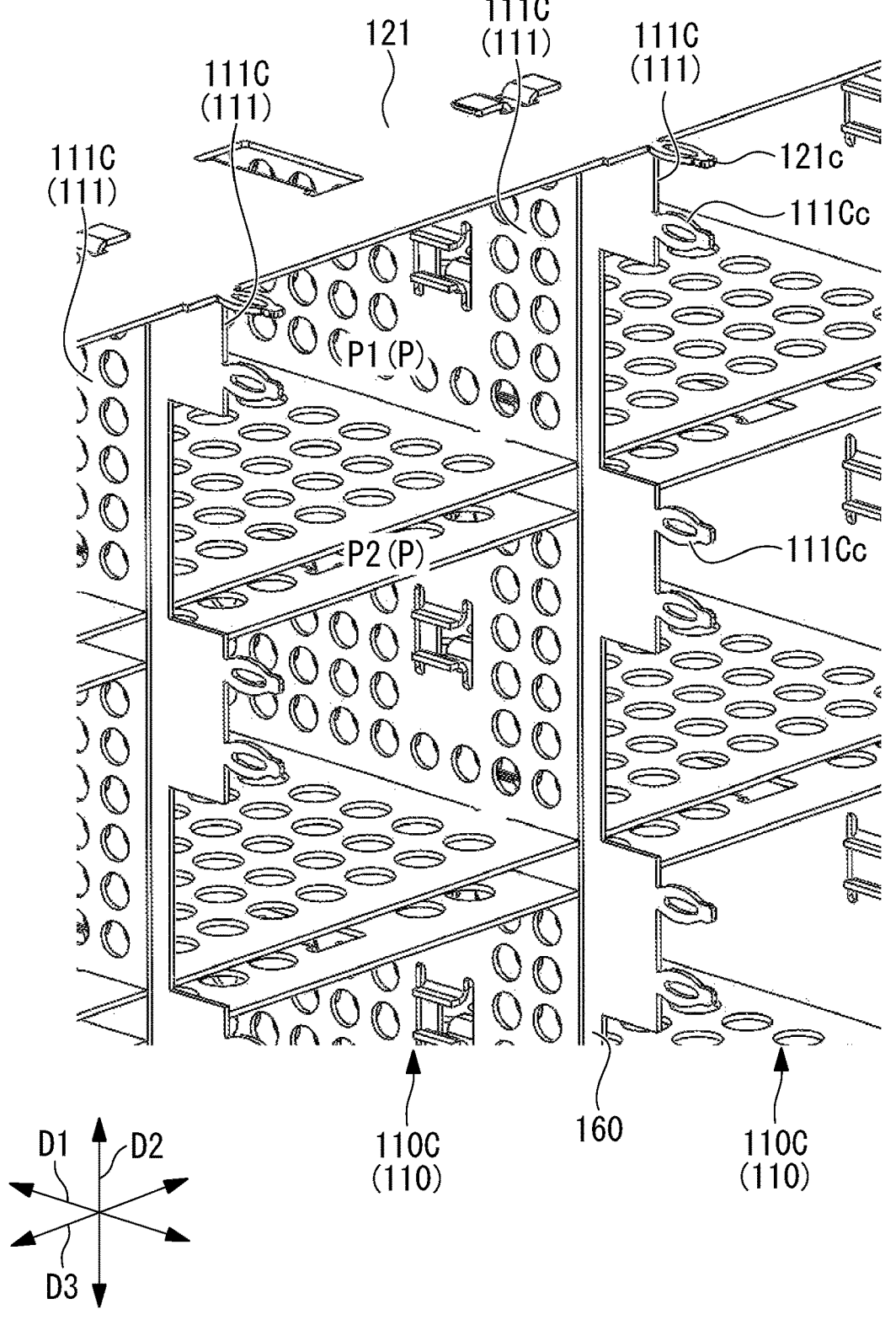
FIG. 21 is a partially enlarged back perspective view of a cage according to still another example of one embodiment of the present disclosure (Example 2).

As the fixing part, as illustrated in FIG. 21, for example, a plurality of press-fit pins 111Cc provided in each vertical plate 111C and a plurality of press-fit pins 121c provided in the top plate 121 are illustrated as examples. Note that, although not illustrated in FIG. 21, a plurality of press-fit pins 131c are also provided in the bottom plate 131.

In Example 2, each press-fit pin 111Cc is provided in one of the two vertical plates 111C facing each other interposing the clearance 160.

Figure 22:
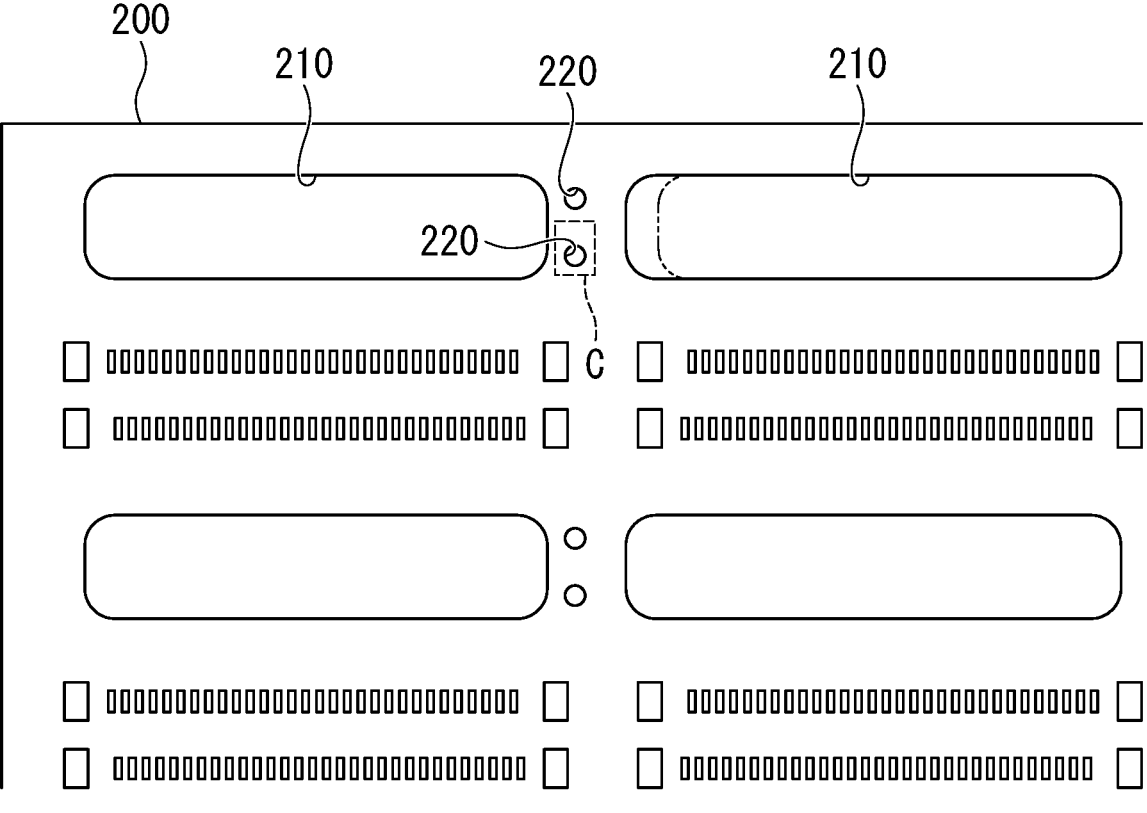
FIG. 22 is a partial enlarged front view of a circuit board (Example 2).
Figure 22:
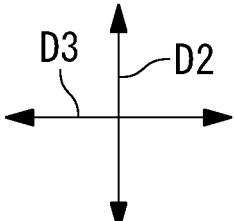

The cage 100 provided with the fixing parts (press-fit pins) as set forth is attached to the circuit board 200 illustrated in FIG. 22.

A plurality of through-holes 220 into which respective press-fit pins are inserted are formed in the circuit board 200 illustrated in FIG. 22.

Each through-hole 220 is arranged between one ventilation opening 210 and another ventilation opening 210 adjacent to each other in the horizontal direction D3.

Herein, as illustrated in FIG. 21, the press-fit pins 111Cc are provided in one of the two vertical plates 111C facing each other interposing the clearance 160. Therefore, as illustrated in FIG. 22, only one through-hole 220 arranged between the ventilation openings 210 is present in the horizontal direction D3 (portion C in FIG. 22).

Thus, compared to Example 1, the dimension of the horizontal direction D3 of the ventilation opening 210 can be increased (the ventilation opening 210 of Example 1 is illustrated by a two-dot chain line). Accordingly, this allows cooling air to more easily flow out to the region in contact with the back face 202 of the circuit board 200.

Note that, in Example 1 and Example 2, the number or the arrangement of through-holes 220 may be changed as appropriate in accordance with the specification. Further, obviously, the number or the arrangement of respective press-fit pins can be changed as appropriate in accordance with the number or the arrangement of through-holes 220.

LIST OF REFERENCE SYMBOLS

10 cage assembly
100 cage
110 (110S, 110C) vertical unit
111 (111S, 111C) vertical plate
111Sb flange
111Ca connecting hole
111Cc press-fit pin (fixing part)
111Cd protrusion
112 (112H, 112M) horizontal plate
112Ha connecting hole
112Hb through-opening
112Ma connecting hole
121 top plate
121c press-fit pin (fixing part)
131 bottom plate
131a connecting hole
131c press-fit pin (fixing part)
141 EMI finger
151 front plate
151a connecting hole
151b slit
152 second front plate 160 clearance
161 clearance front opening
200 circuit board (external board)
201 front face (first face)
202 back face (second face)
210 ventilation opening
220 through-hole
300 connector
410 optical module (external device)
420 heat sink (external device)
Ps port set
P (P1, P2) port
Us unit set

What is claimed is:

1. A cage configured to be attached to a first face of an external board and accommodate a plurality of external devices inserted into the cage along a depth direction substantially orthogonal to the first face,
wherein a direction orthogonal to the depth direction is defined as a vertical direction, and a direction orthogonal to the depth direction and the vertical direction is defined as a horizontal direction,
the cage comprising a plurality of vertical units aligned in a line in the horizontal direction,
wherein each vertical unit defines a port set in which a plurality of ports as spaces accommodating the external devices are aligned in a line in the vertical direction,
wherein the vertical unit includes two vertical plates extending in the vertical direction, spanning over the entire height in the vertical direction of the port set, and arranged facing each other in the horizontal direction and spaced from each other by a distance corresponding to a width in the horizontal direction of the ports,
wherein the vertical unit including a plurality of horizontal plates extending in the horizontal direction, arranged between the vertical plates, and arranged facing each other in the vertical direction,
wherein in the vertical unit, the plurality of ports included in the port set are defined by the two vertical plates and the plurality of horizontal plates, and
wherein the plurality of vertical units include a first vertical unit and a second vertical unit adjacent to the first vertical unit in the horizontal direction and defining a clearance therebetween as a space accommodating none of the external devices.

2. The cage according to claim 1,
wherein the clearance includes a rear opening facing the external board, and a front opening located opposite to the rear opening.

3. The cage according to claim 2 further comprising at least one front plate,
wherein the front plate covers the front opening of the clearance, and is fixed to a front edge of one vertical plate of the first vertical unit and a front edge of one vertical plate of the second vertical unit facing each other interposing the clearance.

4. The cage according to claim 3,
wherein the front plate includes a plurality of connecting holes, and
wherein the connecting holes connect the clearance to outside.

5. The cage according to claim 3 further comprising a plurality of EMI fingers,
wherein each of the EMI fingers is attached to the front edge while interposing and pinching both faces of each of the vertical plates, and wherein the front plate is made of metal, and is in contact with the EMI fingers.

6. The cage according to claim 1,
wherein the plurality of vertical plates each include a fixing part, and
wherein the fixing part protrudes in the depth direction from a rear edge of the vertical plate facing the external board, and is configured to be fixed to the external board.

7. The cage according to claim 6, wherein the fixing part is a press-fit pin to be press-fitted to the external board.

8. The cage according to claim 1,
wherein the plurality of horizontal plates include a plurality of connecting holes, and
wherein the connecting holes connect a top face and a bottom face of each of the horizontal plates.

9. The cage according to claim 1, wherein each of the external devices is an optical module, or an optical module and a heat sink for cooling the optical module.

10. The cage according to claim 1 further comprising:
a top plate; and
a bottom plate,
wherein, when a set of the plurality of vertical units aligned in a line in the horizontal direction is defined as a unit set,
the top plate spans over the entire width in the horizontal direction of the unit set, and is fixed to an upper edge of each of the vertical plates of the plurality of vertical units included in the unit set, and
the bottom plate spans over the entire width in the horizontal direction of the unit set, and is fixed to a lower edge of each of the vertical plates of the plurality of vertical units included in the unit set.

11. The cage according to claim 10,
wherein the top plate and/or the bottom plate includes a fixing part, and
wherein the fixing part protrudes along the depth direction from a rear edge of the top plate and/or the bottom plate facing the external board, and is configured to be fixed to the external board.

12. The cage according to claim 11, wherein the fixing part is a press-fit pin to be press-fitted to the external board.

13. The cage according to claim 10,
wherein bottom plates include a plurality of connecting holes, and
wherein the connecting holes connect a top face and a bottom face of each of the bottom plates.

14. A cage assembly comprising:
the cage according to claim 1; and
a circuit board as the external board.

15. A cage configured to be attached to a first face of an external board and accommodate a plurality of external devices inserted into the cage along a depth direction substantially orthogonal to the first face,
wherein each of the external devices is an optical module, or an optical module and a heat sink for cooling the optical module, and
wherein a direction orthogonal to the depth direction is defined as a vertical direction, and a direction orthogonal to the depth direction and the vertical direction is defined as a horizontal direction,
the cage comprising at least one vertical unit, the vertical unit defining a port set in which a plurality of ports as spaces accommodating the external devices are aligned in a line in the vertical direction, and wherein in the plurality of ports aligned in a line in the vertical direction, a first port is the port in which the optical module is accommodated, and a second port located adjacent to the first port in the vertical direction and located above the first port is the port in which the heat sink is accommodated, wherein the vertical unit includes two vertical plates extending in the vertical direction, spanning over the entire height in the vertical direction of the port set, and arranged facing each other in the horizontal direction and spaced from each other by a distance corresponding to a width in the horizontal direction of the ports, wherein the vertical unit includes a plurality of horizontal plates extending in the horizontal direction, arranged between the vertical plates, and arranged facing each other in the vertical direction, and wherein one of the horizontal plates separates the first port and the second port from each other and includes a through-opening connecting the first port and the second port, and wherein in the vertical unit, the plurality of ports included in the port set are defined by the two vertical plates and the plurality of horizontal plates.

16. A cage assembly comprising:

a cage configured to be attached to a first face of an external board and accommodate a plurality of external devices inserted into the cage along a depth direction substantially orthogonal to the first face, wherein a direction orthogonal to the depth direction is defined as a vertical direction, and a direction orthogonal to the depth direction and the vertical direction is defined as a horizontal direction, the cage comprising:

at least one vertical unit, wherein the vertical unit defines a port set in which a plurality of ports as spaces accommodating the external devices are aligned in a line in the vertical direction, wherein the vertical unit includes two vertical plates extending in the vertical direction, spanning over the entire height in the vertical direction of the port set, and arranged facing each other in the horizontal direction and spaced from each other by a distance corresponding to a width in the horizontal direction of the ports, wherein each vertical plate includes a press-fit pin protruding in the depth direction from a rear edge of the vertical plate facing the external board, the press-fit pin being configured to be press-fitted to the external board, wherein the vertical unit including a plurality of horizontal plates extending in the horizontal direction, arranged between the vertical plates, and arranged facing each other in the vertical direction, and wherein in the vertical unit, the plurality of ports included in the port set are defined by the two vertical plates and the plurality of horizontal plates; and a circuit board as the external board, wherein the circuit board includes a plurality of ventilation openings, and a plurality of through-holes, wherein the plurality of ventilation openings are openings penetrating through between the first face of the circuit board and a second face corresponding to a back face of the first face, wherein the plurality of ventilation openings being arranged so as to each correspond to a position of each of the ports, and being aligned in a line with a spacing from each other in the horizontal direction, wherein the plurality of through-holes each are a hole into which the press-fit pin of each of the vertical plates is press-fitted, and wherein the plurality of through-holes being arranged between the ventilation openings in the horizontal direction.

\* \* \* \* \*